United States Patent
Fujibayashi et al.

(10) Patent No.: US 8,648,135 B2
(45) Date of Patent: Feb. 11, 2014

(54) SURFACE-TREATMENT AGENT, METHOD FOR PRODUCING COATED STEEL SHEET USING THE SURFACE-TREATMENT AGENT, AND COATED STEEL SHEET

(75) Inventors: Nobue Fujibayashi, Chiba (JP); Satoru Ando, Chiba (JP)

(73) Assignee: JFE Steel Corporation (JP)

( * ) Notice: Subject to any disclaimer, the term of this patent is extended or adjusted under 35 U.S.C. 154(b) by 232 days.

(21) Appl. No.: 13/260,638

(22) PCT Filed: Mar. 31, 2010

(86) PCT No.: PCT/JP2010/056280
§ 371 (c)(1),
(2), (4) Date: Dec. 12, 2011

(87) PCT Pub. No.: WO2010/114171
PCT Pub. Date: Oct. 7, 2010

(65) Prior Publication Data
US 2012/0114957 A1    May 10, 2012

(30) Foreign Application Priority Data

Mar. 31, 2009  (JP) .................................. 2009-088410

(51) Int. Cl.
*C09D 175/04* (2006.01)

(52) U.S. Cl.
USPC ............ 524/413; 428/457; 524/398; 427/386

(58) Field of Classification Search
USPC ......................................................... 524/413
See application file for complete search history.

(56) References Cited

U.S. PATENT DOCUMENTS 6,180,177 B1 *  1/2001  Nagashima et al. ....... 427/388.4

FOREIGN PATENT DOCUMENTS

| JP | 53-121034 | A | 10/1978 |
|---|---|---|---|
| JP | 57044751 | B | 9/1982 |
| JP | 1-177380 | A | 7/1989 |
| JP | 11-058599 | A | 3/1999 |
| JP | 11-310757 | A | 11/1999 |
| JP | 2000-248369 | A | 9/2000 |
| JP | 2001-059184 | A | 3/2001 |
| JP | 2001-181860 | A | 7/2001 |
| JP | 2003-013252 | A | 1/2003 |
| JP | 2003-155451 | A | 5/2003 |
| JP | 2004-238716 | A | 8/2004 |
| JP | 3573307 | B2 | 10/2004 |
| JP | 2006-043913 | A | 2/2006 |
| JP | 2006-082365 | A | 3/2006 |
| JP | 2006-152436 | A | 6/2006 |
| JP | 3883831 | B2 | 2/2007 |
| JP | 4078044 | B2 | 4/2008 |

\* cited by examiner

*Primary Examiner* — Doris Lee
(74) *Attorney, Agent, or Firm* — DLA Piper LLP (US)

(57) ABSTRACT

A surface-treatment agent contains a resin compound having a specific bisphenol skeleton, a cationic urethane resin emulsion, a silane coupling agent, an organic titanium chelate compound, a tetravalent vanadyl compound, and water, with predetermined proportions and having a pH of 4 to 5; a method for producing a coated steel sheet using the surface-treatment agent; and a coated steel sheet.

6 Claims, No Drawings

SURFACE-TREATMENT AGENT, METHOD FOR PRODUCING COATED STEEL SHEET USING THE SURFACE-TREATMENT AGENT, AND COATED STEEL SHEET

RELATED APPLICATIONS

This is a §371 of International Application No. PCT/JP2010/056280, with an international filing date of Mar. 31, 2010 (WO 2010/114171 A1, published Oct. 7, 2010), which is based on Japanese Patent Application No. 2009-088410, filed Mar. 31, 2009, the subject matter of which is incorporated by reference.

TECHNICAL FIELD

This disclosure relates to a surface-treatment agent for coated steel sheets optimally used for applications of automobiles, household electrical appliances, and building materials, in particular, an environmentally friendly surface-treatment agent that is completely free from chromium and the like at the time of production and during production. The disclosure also relates to a method for producing a coated steel sheet using the treatment agent and a surface-treated coated steel sheet.

BACKGROUND

Steel sheets obtained by subjecting surfaces of galvanized steel sheets to a chromate treatment with a treatment solution mainly containing chromic acid, dichromic acid, or a salt of the foregoing for the purpose of enhancing corrosion resistance (white-rust resistance and red-rust resistance) are widely used as steel sheets for household electrical appliances, steel sheets for building materials, and steel sheets for automobiles. The chromate treatment provides excellent corrosion resistance and is an economical treatment that can be relatively easily performed.

The chromate treatment employs hexavalent chromium, which is a regulated substance causing pollution. However, the chromate treatment employs hexavalent chromium within a closed system and completely reduces and collects hexavalent chromium without releasing it into the nature. In addition, organic films can provide a sealing function of substantially preventing release of chromium from chromate films. Accordingly, the chromate treatment does not substantially cause contamination of the environment or human bodies with hexavalent chromium. However, due to recent global environmental issues, there has been a strong trend toward voluntary reduction in use of hexavalent chromium. In addition, to prevent environmental contamination caused by dumping of shredded dust of discarded products, there has already been a trend toward, in products, minimization of the amount of hexavalent chromium or reduction in the amount of hexavalent chromium.

Accordingly, a large number of treatment techniques for suppressing the generation of white rust on galvanized steel sheets without employing a chromate treatment, that is, chromium-free techniques, have been developed. For example, there is a technique of forming surface-treatment films on galvanized steel sheets by using an inorganic compound, an organic compound, an organic polymer material, or a composition containing the foregoing in combination. Although various advantageous techniques have been developed, with commercial use of these chromium-free techniques, objects that were not recognized and need to be achieved have been newly found.

It could therefore be helpful to enhance corrosion resistance in processed portions of surface-treated galvanized steel sheets. Surface-treated galvanized steel sheets are subjected to processing (cutting, bending, welding of parts, and painting) to be turned into products. When a surface-treated galvanized steel sheet is bent, a coated layer in the front surface of the bent portion is extended. In this case, a surface-treatment film is also extended by the bending and the surface-treatment film is damaged and the galvanized surface is exposed. Degradation of corrosion resistance in such exposed portions is problematic. In particular, unlike cupping causing local damage, bending causes continuous damage in the film and the coated layer. Accordingly, it is very difficult to provide processed portions having sufficient corrosion resistance.

It could also be helpful to ensure solvent resistance of a surface-treatment film. In the above-described processing, oil stains on the surface of the film or symbols written with a magic marker are sometimes wiped off with a solvent. In these cases, use of the solvent often causes a phenomenon where the surface-treatment film becomes separated and discolored to have a pale color (whitening). When a surface-treatment film is separated from a (surface-treated) galvanized steel sheet, the steel sheet does not have corrosion resistance. When a surface-treatment film turns white, the appearance quality is degraded.

It could further be helpful to ensure paintability of a surface-treatment film. There are cases where the surfaces of a surface-treated galvanized steel sheet that is processed as described above are cleaned with an alkaline cleaning agent or the like (alkaline degreasing) and the cleaned surfaces are painted. Accordingly, overpaintability of surfaces having been subjected to alkaline degreasing is sometimes required. However, there are no publicly known references regarding studies on such a characteristic.

It could still further be helpful to achieve sufficient corrosion resistance of a surface-treatment film and sufficient storage stability of a surface-treatment agent. Recent chromium-free techniques most commonly employ formation of a surface-treatment film on a galvanized steel sheet by application and drying, that is, application formation. To impart a barrier effect to a surface-treatment film formed in such a manner, the surface-treatment film needs to have predetermined water resistance. This is because it is difficult for a surface-treatment film that readily dissolves back into water to have corrosion resistance (barrier effect). In addition, in industry, it is important that a surface-treatment agent prepared as a one-component agent by mixing raw materials with predetermined proportions can be stored with stability. Considering summer, it is desirable that a surface-treatment agent can be stored with stability without alteration for a long period of time at 35° C. to 40° C. To achieve such storage stability, it is necessary that an increase in viscosity, gelation, precipitation, and the like do not occur in a surface-treatment agent, that is, the surface-treatment agent has predetermined water solubility; and the surface-treatment agent can maintain the quality at the time of the preparation thereof even after storage over a long period of time.

As described above, surface-treated galvanized steel sheets having more excellent characteristics are demanded. Hereafter, specific examples of existing chromium-free techniques will be described. Japanese Unexamined Patent Application Publication No. 53-121034 discloses a method in which an aqueous solution containing a water-dispersible silica, an alkyd resin, and a trialkoxysilane compound is applied to a metal surface and dried to thereby form a coating film. Japanese Examined Patent Application Publication No. 57-44751 and Japanese Unexamined Patent Application Publication No. 1-177380 disclose a surface-treatment method employing a water-soluble resin composed of a hydroxypyrone compound derivative to impart corrosion resistance to metal materials; and a method employing an aqueous solution of a hydroxystyrene compound or a water-dispersible polymer to impart corrosion resistance to metal materials. Japanese Unexamined Patent Application Publication No. 11-310757 discloses a technique employing a surface-treatment agent obtained by mixing an aqueous resin, colloidal silica, and ammonium vanadate with specific proportions. However, these techniques cannot achieve a film that provides corrosion resistance that is sufficient to replace chromate films.

Japanese Unexamined Patent Application Publication No. 2000-248369 discloses a technique of a surface-treatment film containing an organic resin and a thiocarbonyl-group-containing compound. However, the surface-treatment film does not provide sufficient corrosion resistance after being subjected to alkaline degreasing. Japanese Unexamined Patent Application Publication No. 11-58599 discloses a technique in which a surface of a metal plate is treated with a treatment solution that is an aqueous solution of lithium silicate containing an organic resin, a silane coupling agent, and a solid lubricant. However, the inorganic components tend to form a rigid polymer. Hence, corrosion resistance in portions processed by bending or the like is insufficient. In addition, due to the presence of the alkali metal, secondary adhesion of painting is poor. Japanese Unexamined Patent Application Publication No. 2006-43913 discloses a technique of forming a resin film with a resin aqueous solution containing a carboxyl-group-containing polyurethane resin, an aqueous dispersion of an ethylene-unsaturated carboxylic acid copolymer, silica particles, and a silane coupling agent with specific proportions. However, solvent resistance and corrosion resistance in processed portions are not sufficiently achieved. Japanese Patent No. 3573307 discloses a steel sheet having a film containing a urethane resin, a lubricant, an inorganic colloid compound, and a silane coupling agent with specific proportions. This film is designed for electrodeposition and excellent in terms of electrodeposition properties, but does not provide sufficient corrosion resistance in processed portions.

Japanese Unexamined Patent Application Publication No. 2001-59184 discloses a surface-treatment solution containing a silane coupling agent and a urethane resin and adjusted to have a pH of 2.5 to 4.5. However, the solution does not provide sufficient corrosion resistance after alkaline degreasing and does not provide sufficient solvent resistance. Japanese Unexamined Patent Application Publication No. 2003-155451 discloses a technique of forming a film with a treatment solution containing a water-dispersible resin, silica particles, and organic titanate with specific proportions. However, the technique does not provide sufficient corrosion resistance in processed portions. Japanese Unexamined Patent Application Publication No. 2006-82365 and Japanese Unexamined Patent Application Publication No. 2001-181860 disclose techniques of forming a film with a treatment solution containing an aqueous dispersion of a specific epoxy resin, a dispersion of a urethane resin, a silane coupling agent, phosphoric acid and/or a phosphate compound, and a compound having 1 to 5 fluorine atoms in a molecule. However, the film has insufficient alkali resistance and it is difficult for the film to have sufficient corrosion resistance and paintability after alkaline degreasing; and the film does not provide sufficient corrosion resistance in processed portions or sufficient solvent resistance.

Japanese Unexamined Patent Application Publication No. 2001-181860 discloses a technique of forming a film with a treatment solution containing a specific resin compound, a vanadium compound, and a metal compound containing a specific metal. However, the film has insufficient alkali resistance and does not provide sufficient corrosion resistance after alkaline degreasing; and the film has unresolved problems that, for example, the film tends to turn yellow under heating. Japanese Patent No. 3,883,831 discloses a technique of forming a film with a treatment agent containing a specific resin compound, a cationic urethane resin having a cationic functional group, a silane coupling agent having a reactive functional group, a Ti compound, and an acid compound with specific proportions. This technique provides a film excellent in terms of corrosion resistance and fingerprint resistance. However, corrosion resistance after alkaline degreasing, corrosion resistance in processed portions, and solvent resistance are not studied and these characteristics are not sufficiently achieved. Japanese Patent No. 4,078,044 discloses a technique relating to a surface-treatment agent containing at least one aqueous resin selected from a cationic resin and a nonionic resin, a metal compound containing a specific metal, and water. Similarly, alkali resistance, corrosion resistance in processed portions, and solvent resistance are not studied and these characteristics are not sufficiently achieved. Japanese Unexamined Patent Application Publication No. 2006-152436 discloses a technique employing a surface-treatment agent containing a cationic urethane, a cationic phenol polycondensate, and a compound containing titanium and a specific metal with specific proportions. However, solvent resistance and paintability are not studied and these characteristics are not sufficiently achieved.

In addition, all the existing surface-treatment agents containing silane coupling agents tend to have poor storage stability. Accordingly, even when surface-treatment agents after storage have normal appearance, the surface-treatment agents do not often provide desired characteristics. Existing techniques do not study such a problem at all.

It could therefore be helpful to provide a chromium-free surface-treatment agent used for coated steel sheets, overcomes the above-described problems of existing techniques, allows for formation of films having excellent corrosion resistance on surfaces of metal materials, provides excellent corrosion resistance in bent portions, solvent resistance, and paintability after alkaline degreasing, and has excellent storage stability in the state of a one-component agent; a method for producing a coated steel sheet with the treatment agent; and a surface-treated coated steel sheet.

SUMMARY

We discovered that by treating a surface of a galvanized steel sheet with a surface-treatment agent containing a specific resin compound, a specific cationic urethane resin, a silane coupling agent having a specific functional group, a specific organic Ti chelate compound, a tetravalent vanadyl compound, with specific proportions, a film having excellent corrosion resistance can be formed and a film that is excellent in terms of solvent resistance and paintability can be formed. In addition, we found that similar films can be formed with the surface-treatment agent even after storage.

We thus provide:
(1) A surface-treatment agent includes
(A) a resin compound (hereafter, referred to as "resin compound (A)") having a bisphenol skeleton represented by a general formula (I) below;

(B) a cationic urethane resin emulsion (hereafter, referred to as "cationic urethane (B)") having at least one cationic functional group selected from primary to tertiary amino groups and a quaternary ammonium salt group;

(C) at least one silane coupling agent having at least one reactive functional group selected from an active-hydrogen-containing amino group, an epoxy group, a mercapto group, and a methacryloxy group;

(D) an organic titanium chelate compound;

(E) a tetravalent vanadyl compound; and (F) water, wherein, a mass ratio $[(b)/\{(a)+(b)+(c)\}]$ of a solid content of the cationic urethane (B) to a total of solid contents of the resin compound (A), the cationic urethane (B), and the silane coupling agent (C) is 0.1 to 0.3, a mass ratio $[(c)/\{(a)+(b)+(c)\}]$ of the solid content of the silane coupling agent (C) to the total of the solid contents of the resin compound (A), the cationic urethane (B), and the silane coupling agent (C) is 0.6 to 0.85, a mass ratio $\{(c)/Ti\}$ of the solid content of the silane coupling agent (C) to a content of the organic titanium chelate compound (D) in terms of titanium is 50 to 70, a mass ratio (V/Ti) of a content of the tetravalent vanadyl compound (E) in terms of vanadium to the content of the organic titanium chelate compound (D) in terms of titanium is 0.3 to 0.5, the surface-treatment agent has a pH of 4 to 5, in the formulae, (a) represents the solid content of the resin compound (A), (b) represents the solid content of the cationic urethane (B), (c) represents the solid content of the silane coupling agent (C), Ti represents the content of the organic titanium chelate compound (D) in terms of titanium, and V represents the content of the tetravalent vanadyl compound (E) in terms of vanadium,

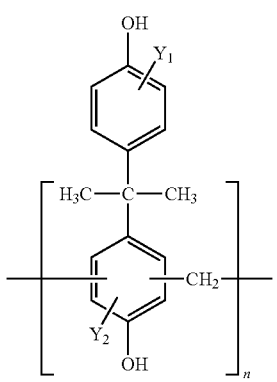
(I)

where $Y_1$ and $Y_2$ are bonded to benzene rings each independently represent hydrogen or a Z group represented by a general formula (II) or (III) below; an average substitution number of the Z group per benzene ring is 0.2 to 1.0; n represents an integer of 2 to 50, and

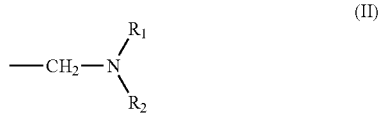
(II)

-continued

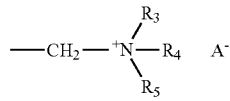
(III)

wherein $R_1$, $R_2$, $R_3$, $R_4$, and $R_5$ each independently represent a hydrogen atom, an alkyl group having 1 to 10 carbon atoms, or a hydroxyalkyl group having 1 to 10 carbon atoms; and $A^-$ represents a hydroxide ion or an acid ion.

(2) The surface-treatment agent according to (1) above further includes (W) a wax, wherein a mass ratio $[(w)/\{(a)+(b)\}]$ of a solid content of the wax (W) to a total of the solid contents of the resin compound (A) and the cationic urethane (B) is 0.2 to 0.4, and in the formula, (w) represents the solid content of the wax (W), (a) represents the solid content of the resin compound (A), and (b) represents the solid content of the cationic urethane (B).

(3) A method for producing a coated steel sheet includes applying the surface-treatment agent according to (1) or (2) above to a coated steel sheet, and drying the surface-treatment agent at a sheet temperature of 50° C. to 180° C. to form a surface-treatment film having a coating weight of 0.2 to 1.8 g/m² on a surface of the steel sheet.

(4) A coated steel sheet produced by the method for producing a coated steel sheet according to (3) above.

A film can be formed that has corrosion resistance equivalent to that of chromate films and is excellent in terms of corrosion resistance in processed portions formed during production process, solvent resistance, and paintability after alkaline degreasing. Thus, chromium-free coated steel sheets that are more useful than existing products can be provided. In addition, a chromium-free surface-treatment agent for coated steel sheets is also excellent in terms of storage stability and hence is very advantageous in industrial usage.

DETAILED DESCRIPTION

Hereinafter, details will be described. Steel sheets serving as bases of surface-treated steel sheets are coated steel sheets that are produced from cold-rolled sheet steels and used for household electrical appliances, building materials, and automobile parts. To provide advantages of a surface-treatment agent markedly, galvanized steel sheets are preferably used. Examples of galvanized steel sheets include electrogalvanized steel sheets, hot dip galvanized steel sheets, zinc-aluminum alloy-coated steel sheets, zinc-iron alloy-coated steel sheets, zinc-magnesium coated steel sheets, and zinc-aluminum-magnesium alloy-coated steel sheets. Our agents are also applicable to aluminum materials such as aluminum-coated steel sheets, aluminum-Si alloy-coated steel sheets, and aluminum sheets. However, most preferably, our agents are applied to galvanized steel sheets.

Such galvanized steel sheets may be provided, for the purpose of enhancing blackening resistance of galvanized steel sheets, by adding a small amount of Ni or Co to coating or by precipitating Ni, Co, and Fe on surfaces of the galvanized steel sheets using an acid or alkali aqueous solution containing these metals.

Hereinafter, a surface-treatment agent will be described.

A surface-treatment agent includes (A) a resin compound represented by a general formula (I) below; (B) a cationic urethane; (C) at least one silane coupling agent having at least one reactive functional group selected from an active-hydrogen-containing amino group, an epoxy group, a mercapto group, and a methacryloxy group; (D) an organic titanium chelate compound; (E) a tetravalent vanadyl compound; and (F) water, wherein, a mass ratio [(b)/{(a)+(b)+(c)}] of the solid content of the cationic urethane (B) to the total of the solid contents of the resin compound (A), the cationic urethane (B), and the silane coupling agent (C) is 0.1 to 0.3; a mass ratio [(c)/{(a)+(b)+(c)}] of the solid content of the silane coupling agent (C) to the total of the solid contents of the resin compound (A), the cationic urethane (B), and the silane coupling agent (C) is 0.6 to 0.85; a mass ratio {(c)/Ti} of the solid content of the silane coupling agent (C) to the content of the organic titanium chelate compound (D) in terms of titanium is 50 to 70; a mass ratio (V/Ti) of the content of the tetravalent vanadyl compound (E) in terms of vanadium to the content of the organic titanium chelate compound (D) in terms of titanium is 0.3 to 0.5; and the surface-treatment agent has a pH of 4 to 5.

In the formulae, (a) represents the solid content of the resin compound (A), (b) represents the solid content of the cationic urethane (B), (c) represents the solid content of the silane coupling agent (C), Ti represents the content of the organic titanium chelate compound (D) in terms of titanium, and V represents the content of the tetravalent vanadyl compound (E) in terms of vanadium. Hereafter, the same definitions are used.

In a surface-treatment agent, the resin compound (A) is represented by the following Formula (I):

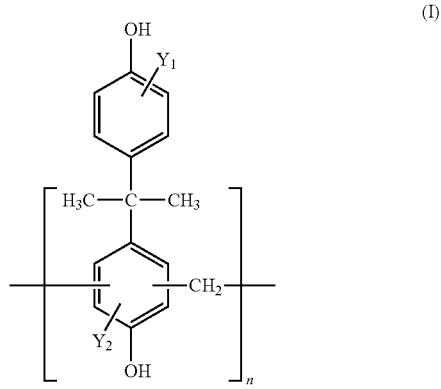

In the formula, $Y_1$ and $Y_2$ are bonded to benzene rings each independently represent hydrogen or a Z group represented by the Formula (II) or (III) below; an average substitution number of the Z group per benzene ring is 0.2 to 1.0; and n represents an integer of 2 to 50.

Herein, the average substitution number of the Z group is a value obtained by dividing the total number of the Z groups introduced by the total number of the benzene rings (that is, 2n). When the Z groups are selected for Y1 and Y2, the resin compound (A) has cationic functional groups of a secondary amino group, a tertiary amino group and a quaternary ammonium salt group. Accordingly, the resin compound (A) can dissolve with more stability in a surface-treatment agent that is acidic (pH 4 to 5). Average degree of polymerization n is defined as 2 to 50. When n is less than 2, the effect of imparting corrosion resistance is insufficient. When n is more than 50, degradation of water solubility, an increase in viscosity, or the like occurs and stability in the treatment agent is degraded, which results in insufficient storage stability.

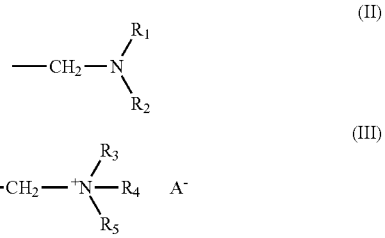

In the formulae (II) and (III), $R_1$, $R_2$, $R_3$, $R_4$, and $R_5$ each independently represent a hydrogen atom, an alkyl group having 1 to 10 carbon atoms, or a hydroxyalkyl group having 1 to 10 carbon atoms. When the number of the carbon atoms of the alkyl group or the hydroxyalkyl group is more than 10, the resin compound (A) cannot be sufficiently dissolved in water, becomes unstable in the treatment agent, and cannot be used. Specific examples of $R_1$, $R_2$, $R_3$, $R_4$, and $R_5$ include methyl, ethyl, propyl, butyl, hydroxyethyl, 2-hydroxypropyl, and hydroxyisobutyl.

$A^-$ represents a hydroxide ion or an acid ion. Specific examples of the acid ion include an acetate ion, a phosphate ion, and formate ion.

The resin compound (A) represented by Formula (I) is a bisphenol-formalin condensate and a synthetic method thereof is not limited. For example, the resin compound (A) can be obtained by allowing formalin and amine to react with bisphenol A in the presence of an alkaline catalyst.

The cationic urethane (B) in a surface-treatment composition is not particularly limited in terms of a polyol component and an isocyanate component that are monomer components forming the cationic urethane (B) and polymerization method as long as the cationic urethane (B) has at least one cationic functional group selected from primary to tertiary amino groups and a quaternary ammonium salt group. Examples of the cationic functional group include an amino group, a methylamino group, an ethylamino group, a dimethylamino group, a diethylamino group, a trimethylamino group, and a triethylamino group. However, the cationic functional groups are not limited as long as they are primary to tertiary amino groups and a quaternary ammonium salt group and they do not degrade performance.

The silane coupling agent (C) in a surface-treatment agent has at least one reactive functional group selected from an active-hydrogen-containing amino group, an epoxy group, a mercapto group, and a methacryloxy group. The silane coupling agent (C) is preferably a trialkoxysilane having three alkoxy. Such at least one silane coupling agent may be used without particular limitations. Specific examples of the silane coupling agent include N-(aminoethyl)-3-aminopropyltrimethoxysilane, 3-aminopropyltrimethoxysilane, 3-glycidoxy-propyltrimethoxysilane, 3-glycidoxypropylmethyldimethoxysilane, 2-(3,4epoxycyclohexyl)ethyltriethoxysilane, and 3-mercaptopropyltrimethoxysilane.

Examples of the organic titanium chelate compound (D) in a surface-treatment agent include acetylacetonato titanium, titanium octylene glycolate, tetraacetylacetonato titanium, and titanium ethyl acetoacetate. Inorganic salts such as titanium nitrate, titanium sulfate, titanium acetate, titanium phosphate, and titanium carbonate cannot dissolve with stability in a treatment agent or do not provide the effect of enhancing corrosion resistance, which is not preferable. Fluorotitanic acid provides the effect. When fluorotitanic acid is used, fluorotitanic acid is preferably added such that the fluorine content relative to the total of the solid contents of the resin compound (A), the cationic urethane (B), and the silane coupling agent (C) is 0.8 mass % or less. When the fluorine content is more than 0.8 mass %, corrosion resistance in processed portions is degraded. When the organic titanium chelate compound is dissolved in water, titanium dissolves in the form of a chelate complex. Accordingly, high-polarity water-soluble solvents and peroxides that affect the complex are not preferably added to a treatment agent.

The tetravalent vanadyl compound (E) used in a surface-treatment agent is also not particularly limited. Specific examples of the tetravalent vanadyl compound (E) include vanadyl sulfate, vanadyl dichloride, vanadyl phosphate, vanadyl oxalate, and vanadyl acetylacetonate. Pentavalent vanadium compounds have high water solubility and hence have a high probability of being released from films and do not sufficiently provide the effect of enhancing corrosion resistance. The tetravalent vanadium compound used in a surface-treatment agent is most preferably a vanadyl compound that provides $VO^{2+}$ (vanadyl) ions because the maximum effect of enhancing corrosion resistance is provided.

In our surface-treatment agent, a mass ratio $[(b)/\{(a)+(b)+(c)\}]$ of the solid content of the cationic urethane (B) to the total of the solid contents of the resin compound (A), the cationic urethane (B), and the silane coupling agent (C) is preferably 0.1 to 0.3, more preferably 0.12 to 0.28. When the ratio is less than 0.1, the proportion of the urethane resin is too low and corrosion resistance in bent portions, heat resistance, and storage stability of the surface-treatment agent become poor. When the ratio is more than 0.3, solvent resistance becomes poor.

In our surface-treatment agent, a mass ratio $[(c)/\{(a)+(b)+(c)\}]$ of the solid content of the silane coupling agent (C) to the total of the solid contents of the resin compound (A), the cationic urethane (B), and the silane coupling agent (C) is preferably 0.6 to 0.85, more preferably 0.65 to 0.80. When the ratio is less than 0.6, solvent resistance becomes poor. When the ratio is more than 0.85, corrosion resistance in processed portions and storage stability of the surface-treatment agent become poor.

In our surface-treatment agent, a mass ratio $\{(c)/Ti\}$ of the solid content of the silane coupling agent (C) to the content of the organic titanium chelate compound (D) in terms of titanium is 50 to 70, preferably 55 to 65. When the ratio is less than 50, corrosion resistance in processed portions and storage stability become poor. When the ratio is more than 70, the probability of being released from a film increases and paintability after alkaline degreasing becomes poor.

Note that, in the calculation of the mass ratios, the mass of the silane coupling agent (C) is defined as the mass of silanol $(R—Si(—OH)_3)$ provided by hydrolysis of alkoxysilane $(R—Si(—OR_1)_3)$. This is because, when the silane coupling agent is dissolved in water, the most portion thereof is hydrolyzed and alcohol generated by the hydrolysis evaporates in the formation of a film by applying and drying a treatment agent and does not function as an active component.

In our surface-treatment agent, a mass ratio (V/Ti) of the content of the tetravalent vanadyl compound (E) in terms of vanadium to the content of the organic titanium chelate compound (D) in terms of titanium is 0.3 to 0.5, preferably 0.35 to 0.48. When the ratio is less than 0.3, corrosion resistance becomes poor. When the ratio is more than 0.5, paintability after alkaline degreasing becomes poor.

The surface-treatment agent has a pH of 4 to 5. When the pH is less than 4, a large amount of zinc is released from galvanized steel sheets that are surface-treated and corrosion resistance becomes poor. When the pH is more than 5, the surface-treatment agent does not have stability. An acid component used for adjusting the pH to be in the range of 4 to 5 is preferably phosphoric acid, acetic acid, formic acid, hydrofluoric acid, a fluoride, or the like. Strong acids such as sulfuric acid and nitric acid are not preferred. When sulfuric acid or nitric acid is used, pH shock (local rapid change in pH) in the pH adjustment tends to cause gelation of cationic phenol and cationic urethane in the surface-treatment agent. In addition, salts generated in the gelation have a high probability of being released and corrosion resistance becomes poor. Acetic acid and formic acid, which are weak acids, are suitable for the pH adjustment. In addition, these acids have a high probability of evaporation and evaporate in the drying of an agent and the amounts of the acids remaining in the film become small. Accordingly, even when excessive amounts of the acids are added, degradation of performance is less likely to be caused, which is preferable. When phosphoric acid is used, the content of phosphoric acid relative to the total of the solid contents of the resin compound (A), the cationic urethane (B), and the silane coupling agent (C) is preferably 8 mass % or less, more preferably 6 mass % or less. The lower limit is not particularly set. However, to enhance corrosion resistance, the phosphoric-acid content is preferably 0.1 mass % or more, particularly preferably 0.5 mass % or more. Although phosphoric acid enhances corrosion resistance, a phosphoric-acid content of more than 8 mass % may cause degradation of storage stability. When hydrofluoric acid or a fluoride is used, hydrofluoric acid or a fluoride is added such that the fluorine content relative to the total of the solid contents of the resin compound (A), the cationic urethane (B), and the silane coupling agent (C) is 0.8 mass % or less. When the fluorine content is more than 0.8 mass %, there is a high probability of etching a zinc coating and corrosion resistance in processed portions is degraded. An alkaline component used for adjusting the pH to be in the range of 4 to 5 is preferably aqueous ammonia or an amine having a boiling point of 100° C. or less. When a strong alkali such as NaOH or KOH is used, pH shock causes formation of a gel material or storage stability is degraded.

The surface-treatment agent may contain a wax (W) for the purpose of ensuring lubricity of films. The wax (W) is preferably added such that a mass ratio $[(w)/\{(a)+(b)\}]$ of the solid content of the wax (W) to the total of the solid contents of the resin compound (A) and the cationic urethane (B) is 0.2 to 0.4, more preferably 0.3 to 0.4. Herein, (w) represents the solid content of the wax (W). Hereafter, the same definition is used. When the mass ratio is 0.2 or more, lubricity is provided; and when the mass ratio is 0.4 or less, lubricity is ensured without economical disadvantage or degradation of corrosion resistance, which is preferable. As the wax (W), one or more waxes having a melting point of 70° C. to 120° C. are preferably used. Specific examples of the wax (W) include polyethylene wax, polyethylene oxide wax, polypropylene wax, and microcrystalline wax. When the melting point is 70° C. or more, lubricity is provided. When the melting point is 120° C. or less, a film does not become too hard and has lubricity. The wax (W) is preferably used in the form of an emulsion in which the wax (W) is stably dispersed in water with an emulsifying agent. The wax (W) preferably has a particle size of 0.08 to 0.3 μm. When the particle size is 0.08 μm or more, the lubricity effect is provided and the amount of an emulsifying agent used does not increase. Hence, alkali resistance and paintability are not degraded. When the particle size is 0.3 μm or less, flotation separation of the wax (W) in the treatment agent due to low specific gravity of the wax (W) does not occur and excellent storage stably is achieved, which is preferable.

Water (F) is preferably a water that is less likely to affect the components of the resin compound (A), the cationic urethane (B), the silane coupling agent (C), and the organic titanium chelate compound (D); and an acid component and an alkaline component used for pH adjustment. Hardness components such as Mg, Ca, and Si contained in water as impurities degrade solubility and dispersibility of the resin compound (A) and the cationic urethane (B) and may cause generation of aggregates of (A) and (B). In addition, when Na, Cl, and the like contained in water as impurities remain in films, they may degrade corrosion resistance or painting adhesion. Accordingly, the water (F) used preferably contains small amounts of impurities and, for example, preferably has an electrical conductivity of less than 100 $\mu$S/cm, more preferably 50 $\mu$S/cm or less, still more preferably 10 $\mu$S/cm or less.

The surface-treatment agent may optionally contain a defoaming agent or a wettability enhancer. The type of the defoaming agent is not particularly limited and may be, for example, an emulsion of silicone or a fatty acid. The wettability enhancer is an agent that decreases the surface tension of the surface-treatment agent to enhance the wettability of the surface-treatment agent to galvanized steel sheets to thereby enhance appearance uniformity. The wettability enhancer may be a water-soluble solvent such as ethanol, T-butanol, or butyl cellosolve. However, the wettability enhancer is not limited to these solvents. For example, a wettability enhancer containing acetylene has a defoaming effect and is preferable. A surface-treatment agent may optionally contain a nitrate such as nickel nitrate or ammonium nitrate for the purpose of enhancing blackening resistance. While nitric acid causes pH shock as described above, nitrates do not cause pH shock.

Hereinafter, a method for producing a coated steel sheet employing the surface-treatment agent will be described.

A surface-treatment film is preferably formed on a coated steel sheet using a surface-treatment agent by applying the surface-treatment agent to the coated steel sheet and drying the surface-treatment agent at a sheet temperature of 50° C. to 180° C. to form a surface-treatment film having a coating weight of 0.2 to 1.8 g/m² relative to a single surface of the steel sheet. The coating weight is more preferably 0.3 to 1.6 g/m², still more preferably 0.4 to 1.4 g/m². When the coating weight is less than 0.2 g/m², corrosion resistance is not sufficiently provided. When the coating weight is more than 1.8 g/m², the effect in terms of coating weight is saturated and such a coating weight is economically disadvantageous and also degrades paintability. A surface-treatment agent may be applied to a coated steel sheet with a roll coater (having a three-roll configuration, a two-roll configuration, or the like), a squeeze coater, a die coater, or the like. After the coating treatment with a squeeze coater or the like, an immersion treatment, or a spraying treatment is performed, an air knife method or a roll-squeezing method may be used to adjust the coating weight and to make the appearance and thickness of the film be uniform.

After a coated steel sheet is coated with a surface-treatment agent, the surface-treatment agent is preferably dried under heating without being rinsed. The drying may be performed with a dryer, an air-heating furnace, a high-frequency induction furnace, an infrared furnace, or the like. The drying is performed at a coated-steel-sheet temperature of 50° C. to 180° C. When the sheet temperature is less than 50° C., a large amount of water remains in the film and corrosion resistance becomes insufficient. When the sheet temperature is more than 180° C., which is not economical, the film becomes hard and brittle and corrosion resistance in processed portions becomes poor.

A coated steel sheet that is produced by the above-described method and has a surface-treatment film may be further coated with a resin film to have higher corrosion resistance.

A surface-treatment film formed with a surface-treatment agent may be formed on a single surface or both surfaces of a coated steel sheet.

Hereinafter, effects will be described. The components of the surface-treatment agent probably have the following effects. However, the description of these effects does not limit this disclosure at all.

The surface-treatment agent mainly contains the resin compound (A), the cationic urethane (B), and the silane coupling agent (C). These main components form the skeleton of a film.

By adjusting the pH of a surface-treatment agent such that the surface-treatment agent becomes weakly acidic, the surface-treatment agent containing the resin compound (A) having a cationic functional group (Formula (II) or (III)), the stability of the surface-treatment agent is enhanced and the storage stability of the surface-treatment agent is ensured. In addition, by making the resin compound (A) be cationic, the resin compound (A) does not dissolve in alkali. Hence, a film having alkali resistance is provided. In addition, by selecting bisphenol as the phenol skeleton of the resin compound (A), the resin compound (A) becomes less likely to dissolve in polar solvents (solvent resistance is imparted) to thereby provide enhanced adhesion and corrosion resistance.

However, the resin compound (A) tends to turn yellow under heating (degradation of thermal yellowing resistance) and tends to provide a hard film. Accordingly, the cationic urethane (B) is further added to reduce hardness due to the phenolic resin to thereby ensure corrosion resistance in processed portions.

Although the cationic urethane (B) has such an advantage, it provides a film that is likely to separate with polar solvents. Accordingly, the silane coupling agent (C) is further added for the purpose of ensuring solvent resistance (relative to polar solvents) and yellowing resistance. The silane coupling agent (C) produces active silanol groups (Si—OH) from end alkoxy groups through hydrolysis and hence contributes to adhesion to a material (galvanized steel sheet) and an overcoat. In addition, a portion of the silane coupling agent (C) undergoes dehydration condensation to generate siloxane bonds (Si—O—Si). The silane coupling agent (C) turns into a polymer by the formation of continuous chains of the siloxane bonds (formation of polysiloxane: —Si—O—Si—O—Si—). As a result, the silane coupling agent (C) has a structure with high stability and can impart corrosion resistance, solvent resistance, and yellowing resistance to the film.

As described above, by using the resin compound (A), the cationic urethane (B), and the silane coupling agent (C) serving as main components with appropriate proportions, highly balanced various characteristics can be probably achieved. However, an agent that overcomes existing problems cannot be obtained with the main components only. The surface-treatment agent contains, as essential components, the main components and the organic titanium chelate compound (D). The organic titanium chelate compound (D) probably functions as a catalyst promoting formation of polysiloxane in the formation of a film by drying the surface-treatment agent. As a result, the film has considerably enhanced alkali resistance, enhanced corrosion resistance after alkaline degreasing, enhanced solvent resistance, and enhanced paintability.

To provide such an effect, a predetermined content of the organic titanium chelate compound (D) is needed, the predetermined content being determined in accordance with the content of the silane coupling agent (C). When the content of the organic titanium chelate compound (D) is low, the desired effect is not provided; and when the content is excessive, the amount of polysiloxane becomes excessively large to provide a hard and brittle film and corrosion resistance in processed portions becomes poor. Although the formation of polysiloxane promoted by the organic titanium chelate compound (D) ideally proceeds in the formation of the film, the organic titanium chelate compound (D) also promotes the formation of polysiloxane during storage of the surface-treatment agent. Accordingly, when the content of the organic titanium chelate compound (D) is excessive, storage stability (suppression of an increase in viscosity and gelation) of the surface-treatment agent becomes poor and the surface-treatment agent after storage no longer has the quality thereof before the storage.

The surface-treatment agent contains the tetravalent vanadyl compound (E) as another essential component. The tetravalent vanadyl compound (E) probably functions as a corrosion inhibitor (for example, passivation of zinc). In particular, vanadyl [$VO^{2+}$] ions having a single oxygen are less likely to be released under a wet environment and remain in the film to provide the inhibitor effect. Accordingly, the vanadyl ions probably enhance corrosion resistance in portions of a coated steel sheet where the coated steel sheet is subjected to strong processing such as bending and the surface-treatment film and the coated surface in the portions undergo ductile fracture; and corrosion resistance after alkaline degreasing. We believe that such an effect is provided only when the film skeleton having a cationic functional group is appropriate and the effect is probably achieved through synergistic effect between the film skeleton and Ti that is also present as a cation.

EXAMPLES

Resin compounds (A) described in Table 1 (Table 1a and Table 1b), urethanes (B) described in Table 2, silane coupling agents (C) described in Table 3, titanium compounds (D) described in Table 4, vanadium compounds (E) described in Table 5, wax (W) emulsions in Table 6 were appropriately mixed to prepare surface-treatment agents. For example, as for a surface-treatment agent in Example 1, mixing was performed to achieve a composition in Table 8; the pH of the mixture was adjusted to a value described in Table 8 with acetic acid and ammonia; and the surface-treatment agent was prepared with deionized water so as to have a dry solid content (drying at 110° C. for 2 hours) of 10 mass %. All the other surface-treatment agents were also adjusted in terms of pH with acetic acid and ammonia and prepared to have a dry solid content of 10 mass %. The deionized water was an ion-exchanged water having an electrical conductivity of 10 μS/cm.

Coated steel sheets described in Table 7 were used as base sheets to be treated. The surfaces of each coated steel sheet were subjected to an alkaline degreasing treatment, rinsed, and dried. A single surface of the coated steel sheet was coated with a surface-treatment agent described in Table 8 with a roll coater and dried at a temperature described in Table 8 under heating without being rinsed. Thus, a coated steel sheet having a surface-treatment film was produced. The coating weight of the surface-treatment film relative to a single surface was adjusted by changing the solid content (heating residue) of the surface-treatment agent or coating conditions (roll separating force, rotational speed, and the like). The coating weight was determined by quantifying Si in the silane coupling agent (C) added with a fluorescent X-ray analysis apparatus and converting the Si quantity. The compositions of the surface-treatment agents and results of tests in terms of quality (corrosion resistance in a flat portion, corrosion resistance in a bent portion, corrosion resistance after alkaline degreasing, thermal discoloration resistance, paintability, paintability after alkaline degreasing, solvent resistance, storage stability, and lubricity) are described in Table 8. The qualities were evaluated under the following conditions.

(1) Corrosion Resistance

The samples were subjected to salt spray testing (JIS-Z-2371-2000) and were evaluated in terms of area percentage of white rust after a lapse of 120 hours. The following evaluation criteria were used:
  Excellent: white-rust area percentage of 0%
  Very Good: white-rust area percentage of less than 5%
  Good: white-rust area percentage of 5% or more and less than 10%
  Fair: white-rust area percentage of 10% or more and less than 20%
  Poor: white-rust area percentage of 20% or more and less than 40%
  Very poor: white-rust area percentage of 40% or more.

(2) Corrosion Resistance in Bent Portion

Each sample was bent at 180° by being sandwiched between rods (formed of stainless steel) having a diameter of 2 mm and was squeezed with a vise. The bent sample was subjected to salt spray testing (JIS-Z-2371-2000) and was evaluated in terms of generation of white rust in the outer (front) surface of the bent portion after a lapse of 72 hours. The following evaluation criteria were used:
  Excellent: no rust in the bent portion
  Very Good: rust area percentage of less than 5% in the bent portion
  Good: rust area percentage of 5% or more and less than 10% in the bent portion
  Fair: rust area percentage of 10% or more and less than 40% in the bent portion
  Poor: rust area percentage of 40% or more and less than 80% in the bent portion
  Very poor: rust area percentage of 80% or more in the bent portion.

(3) Corrosion Resistance after Alkaline Degreasing

An alkaline degreasing agent CL-N364S (manufactured by Nihon Parkerizing Co., LTD.) was dissolved at a concentration of 20 g/l in pure water and heated to 60° C. Each sample was immersed in this alkaline solution for 2 minutes, taken out from the solution, rinsed, and dried. The sample was subjected to salt spray testing (JIS-Z-2371-2000) and was evaluated in terms of area percentage of white rust after a lapse of 72 hours. The evaluation criteria described in (1) above were used.

(4) Thermal Discoloration Resistance

Each sample was heated with an infrared image furnace for 30 seconds so that a sheet temperature may reach 500° C., held for 30 seconds, and allowed to naturally cool to room temperature. The appearance of a surface of the sample was visually inspected. The following evaluation criteria were used:
  Excellent: no discoloration
  Good: very slightly brown
  Fair: discoloration to pale brown
  Poor: discoloration to brown.

(5) Paintability

Each sample was painted with a DELICON (registered trademark) #700 (manufactured by Dai Nippon Toryo Company, Limited), which is a melamine alkyd paint, baked at 130° C. for 30 minutes to form a painted film having a thickness of 30 μm, immersed in boiling water for 2 hours, and immediately cut in a lattice pattern (10×10 squares, pitch: 1 mm) to such a depth as to reach the base steel. The sample was subjected to cupping by 5 mm with an Erichsen tester such that the cut portion was on the outer (front) side. An adhesive tape was affixed to the sample and removed from the sample and delamination area percentage of the painted film was determined. The evaluation criteria below were used. The Erichsen cupping conditions were compliance with JIS-Z-2247-2006 and the punch diameter was 20 mm, the die diameter was 27 mm, and the drawing width was 27 mm.

Excellent: no delamination
Very Good: delamination area of less than 3%
Good: delamination area of 3% or more and less than 10%
Fair: delamination area of 10% or more and less than 20%
Poor: delamination area of 20% or more and less than 50%
Very poor: delamination area of 50% or more (6) Paintability after Alkaline Degreasing Each sample was subjected to alkaline degreasing as in (3) above and subjected to the paintability test as in (5) above. The same evaluation criteria as in (5) were used.

(7) Solvent Resistance

A gauze impregnated with methanol was pressed under a load of 4.90 N (500 gf) onto a surface of each sample and rubbed against the surface in a reciprocating manner for ten cycles under the load. Tracks caused by the rubbing were evaluated by visual inspection. The following evaluation criteria were used:

Excellent: no tracks
Very Good: no tracks visible when viewed from above, but tracks slightly visible when viewed obliquely
Good: no tracks visible when viewed from above, but tracks clearly visible when viewed obliquely
Fair: tracks slightly visible when viewed from above
Poor: tracks clearly visible when viewed from above
Very poor: delamination of the film.

(8) Storage Stability

The surface-treatment agents described in Table 8 were stored in a constant temperature chamber at 40° C. for 30 days. The surface-treatment agents were taken out and the appearance thereof was visually inspected and evaluated. The evaluation criteria below were used. Furthermore, coated steel sheets having surface-treatment films produced with the surface-treatment agents stored under such conditions were subjected to the tests (1) to (3) described above.

Excellent: no change
Good: very small amount of precipitation
Fair: small amount of precipitation or an increase in viscosity to some extent
Poor: large amount of precipitation or gelation (9) Lubricity A disc-shaped specimen having a diameter of 100 mm was cut from each sample and formed into a cup under conditions: a punch diameter of 50 mm, a die diameter of 51.91 mm, and a blank holding force of 1 ton. The appearance of the drawn surface of the formed product (outer side surface of the cup) was visually inspected and was evaluated in terms of how scratched it was and how blackened it was. The following evaluation criteria were used:

Excellent: almost no change over the entire surface, uniform appearance
Very Good: very slightly blackened, but uniform appearance
Good: slightly scratched and blackened and clearly non-uniform appearance
Fair: locally scratched and blackened and clearly nonuniform appearance
Poor: severely scratched and blackened mainly in corner portions
Very poor: cracked and forming was not achieved.

TABLE 1a

| | Z group: Formula (II) | | | | | |
|---|---|---|---|---|---|---|
| | Y1 | | Y2 | | Average substitution | |
| No. | R1 | R2 | R1 | R2 | number of Z group | n |
| A1 | hydrogen | hydrogen | methyl | ethyl | 0.4 | 5 |
| A2 | ethyl | methyl | hydrogen | propyl | 0.7 | 3 |
| A3 | ethyl | propyl | hydrogen | ethyl | 0.4 | 10 |
| A4 | hydroxyethyl | hydroxyethyl | hydroxyethyl | hydroxyethyl | 0.5 | 5 |
| A5 | hydrogen | hydrogen | methyl | ethyl | <u>0.1</u> | 5 |
| A6 | hydrogen | hydrogen | methyl | ethyl | <u>1.2</u> | 5 |
| A7 | hydrogen | hydrogen | methyl | ethyl | 0.4 | <u>80</u> |
| A8 | —C$_{12}$H$_{23}$ | methyl | hydrogen | hydrogen | 0.5 | 5 |
| A9 | hydroxyethyl | hydroxyethyl | hydroxyethyl | hydroxyethyl | <u>0.1</u> | 5 |
| A10 | hydroxyethyl | hydroxyethyl | hydroxyethyl | hydroxyethyl | <u>1.2</u> | 5 |
| A11 | hydroxyethyl | hydroxyethyl | hydroxyethyl | hydroxyethyl | 0.5 | <u>70</u> |
| A12 | —C$_{12}$H$_{22}$OH | methyl | hydrogen | hydrogen | 0.5 | 5 |

※Groups represented by the Formula (II) were used as Z groups.

TABLE 1b

| | Z group: Formula (III) | | | | | | Average substitution number |  |
|---|---|---|---|---|---|---|---|---|
| | Y1 | | | Y2 | | | of Z | |
| No. | R3 | R4 | R5 | R3 | R4 | R5 | group | n |
| A13 | hydrogen | hydrogen | methyl | methyl | ethyl | methyl | 0.4 | 5 |
| A14 | ethyl | methyl | hydrogen | hydrogen | propyl | hydrogen | 0.7 | 3 |
| A15 | ethyl | propyl | methyl | hydrogen | ethyl | methyl | 0.4 | 10 |
| A16 | hydroxyethyl | hydroxyethyl | hydrogen | hydroxyethyl | hydroxyethyl | hydrogen | 0.5 | 5 |

TABLE 1b-continued

| | Z group: Formula (III) | | | | | | Average substitution number of Z group | |
|---|---|---|---|---|---|---|---|---|
| | Y1 | | | Y2 | | | | |
| No. | R3 | R4 | R5 | R3 | R4 | R5 | | n |
| A17 | hydrogen | hydrogen | methyl | methyl | ethyl | methyl | <u>0.1</u> | 5 |
| A18 | hydrogen | hydrogen | methyl | methyl | ethyl | methyl | <u>1.2</u> | 5 |
| A19 | hydrogen | hydrogen | methyl | methyl | ethyl | methyl | 0.4 | <u>80</u> |
| A20 | —$C_{12}H_{23}$ | methyl | hydrogen | hydrogen | hydrogen | hydrogen | 0.5 | 5 |
| A21 | hydroxyethyl | hydroxyethyl | hydrogen | hydroxyethyl | hydroxyethyl | hydrogen | <u>0.1</u> | 5 |
| A22 | hydroxyethyl | hydroxyethyl | hydrogen | hydroxyethyl | hydroxyethyl | hydrogen | <u>1.2</u> | 5 |
| A23 | hydroxyethyl | hydroxyethyl | hydrogen | hydroxyethyl | hydroxyethyl | hydrogen | 0.5 | <u>70</u> |
| A24 | —$C_{12}H_{22}OH$ | methyl | hydrogen | hydrogen | hydrogen | hydrogen | 0.5 | 5 |

※Groups represented by the Formula (III) were used as Z groups.

TABLE 2

| No. | Urethane resin (B) | Ionicity | Manufacturer |
|---|---|---|---|
| B1 | ADEKA BONTIGHTER HUX-670 | Cation | ADEKA CORPORATION |
| B2 | SUPERFLEX 600 | Cation | DAI-ICHI KOGYO SEIYAKU CO., LTD. |
| B3 | PERMARIN UC-20 | Cation | Sanyo Chemical Industries, Ltd. |
| B4 | ADEKA BONTIGHTER UX-206 | Nonion | ADEKA CORPORATION |
| B5 | HYDRAN AP-10 | Anion | DIC Corporation |

TABLE 3

| No. | Silane coupling agent (C) |
|---|---|
| C1 | 3-mercaptopropyltrimethoxysilane |
| C2 | N-(2-aminoethyl)-3-aminopropyltrimethoxysilane |
| C3 | 3-glycidoxypropyltrimethoxysilane |
| C4 | 3-methacryloxypropyltrimethoxysilane |
| C5 | vinyltrimethoxysilane |

TABLE 4

| No. | Ti compound (D) |
|---|---|
| D1 | acetylacetonato titanium (Ti: 12.5%) |
| D2 | tetraacetylacetonato titanium (Ti: 10.8%) |
| D3 | titanium nitrate (Ti: 16.2%) |
| D4 | fluorotitanic acid (Ti: 29.2%) |

TABLE 5

| No. | V compound (E) |
|---|---|
| E1 | vanadyl oxalate (V: 32.9%) |
| E2 | vanadyl acetylacetonate (V: 19.2%) |
| E3 | vanadyl sulfate (V: 31.2%) |
| E4 | ammonium metavanadate (V: 43.5%) |

TABLE 6

| No. | Wax (W) | Melting point (°C.) | Solid content of dispersion (%) | Particle size (μm) |
|---|---|---|---|---|
| W1 | polyethylene oxide wax | 115 | 20 | 0.1 |
| W2 | microcrystalline wax | 90 | 20 | 0.1 |
| W3 | paraffin wax | 50 | 20 | 0.1 |

※These waxes were made to be emulsified with an emulsifying agent and used.

TABLE 7

| No. | Coated steel sheet | Coating weight (g/m²) |
|---|---|---|
| GI | hot dip galvanized steel sheet | 60 |
| EG | electrogalvanized steel sheet | 20 |
| GA | galvannealed steel sheet | 60 |
| GF | hot dip Zn-5mass % Al-0.5mass % Mg alloy-coated steel sheet | 90 |
| GL | hot dip Zn-5.5mass % Al alloy-coated steel sheet | 100 |

※Although both surfaces were coated, a coating weight relative to a single surface is described in the table.

TABLE 8

| No. | | (A) Type Table 1 | parts by mass | (B) Type Table 2 | parts by mass | (C) Type Table 3 | parts by mass | Parts by mass of Ti (D) Type Table 4 | parts by mass | Parts by mass of V (E) Type Table 5 | parts by mass | (W) Type Table 6 | parts by mass | Acid component 1 Type | parts by mass |
|---|---|---|---|---|---|---|---|---|---|---|---|---|---|---|---|
| 1 | Example 1 | A1 | 4 | B1 | 16 | C1 | 60 | D1 | 1 | E1 | 0.4 | — | 0 | phosphoric acid | 4 |
| 2 | Example 2 | A1 | 10 | B1 | 10 | C1 | 60 | D1 | 1 | E1 | 0.4 | — | 0 | phosphoric acid | 4 |
| 3 | Example 3 | A1 | 11 | B1 | 9 | C1 | 60 | D1 | 1 | E1 | 0.4 | — | 0 | phosphoric acid | 4 |
| 4 | Comparative Example 1 | A1 | 14 | B1 | 6 | C1 | 60 | D1 | 1 | E1 | 0.4 | — | 0 | phosphoric acid | 4 |
| 5 | Example 4 | A1 | 0.5 | B1 | 19.5 | C1 | 60 | D1 | 1 | E1 | 0.4 | — | 0 | phosphoric acid | 4 |
| 6 | Example 5 | A1 | 0.5 | B1 | 21.5 | C1 | 58 | D1 | 1 | E1 | 0.4 | — | 0 | phosphoric acid | 4 |
| 7 | Example 6 | A1 | 0.5 | B1 | 23.5 | C1 | 56 | D1 | 1 | E1 | 0.4 | — | 0 | phosphoric acid | 4 |

TABLE 8-continued

| | | | | | | | | | | | | | | |
|---|---|---|---|---|---|---|---|---|---|---|---|---|---|---|
| 8 | Comparative Example 2 | A1 | 0.1 | B1 | 25.9 | C1 | 55 | D1 | 1 | E1 | 0.4 | — | 0 | phosphoric acid | 4 |
| 9 | Comparative Example 3 | A1 | 4 | B1 | 16 | C1 | 60 | <u>D3</u> | 1 | E1 | 0.4 | — | 0 | phosphoric acid | 4 |
| 10 | Comparative Example 4 | A1 | 4 | B1 | 16 | C1 | 60 | <u>D4</u> | 1 | E1 | 0.4 | — | 0 | phosphoric acid | 4 |
| 11 | Comparative Example 5 | A1 | 4 | B1 | 16 | C1 | 60 | D1 | 1 | E1 | <u>0</u> | — | 0 | phosphoric acid | 4 |
| 12 | Comparative Example 6 | A1 | 4 | B1 | 16 | C1 | 60 | D1 | 1 | <u>E4</u> | 0.4 | — | 0 | phosphoric acid | 4 |
| 13 | Comparative Example 7 | A1 | 29 | B1 | 6 | C1 | 65 | <u>D4</u> | 1.134 | E1 | <u>0</u> | — | 0 | nitric acid | <u>10</u> |
| 14 | Comparative Example 8 | A1 | 29 | B1 | 6 | C1 | 65 | <u>D4</u> | 1.134 | E1 | <u>0</u> | — | 0 | phosphoric acid | <u>10</u> |
| 15 | Comparative Example 9 | A1 | 20 | B1 | 40 | C2:C3 = 1:1 | 20 | <u>D4</u> | 1 | E1 | 0.4 | — | 0 | phosphoric acid | 6 |
| 16 | Example 7 | A2 | 4 | B1 | 16 | C2 | 60 | D1 | 1 | E2 | 0.4 | — | 0 | phosphoric acid | 4 |
| 17 | Example 8 | A3 | 4 | B1 | 16 | C2 | 60 | D2 | 1 | E3 | 0.4 | — | 0 | — | 0 |
| 18 | Example 9 | A2 | 4 | B1 | 19 | C3 | 60 | D1 | 1 | E2 | 0.4 | — | 0 | phosphoric acid | 5 |
| 19 | Example 10 | A1 | 4 | B1 | 19 | C2:C3 = 1:1 | 60 | D1 | 1 | E3 | 0.4 | — | 0 | — | 0 |
| 20 | Example 11 | A1 | 4 | B1 | 19 | C1 | 60 | D1:D4 = 10:1 | 1.1 | E2 | 0.4 | — | 0 | phosphoric acid | 4 |
| 21 | Comparative Example 10 | A1 | 19 | B1 | 19 | C1 | 45 | D1 | 0.75 | E2 | 0.3 | — | 0 | phosphoric acid | 4 |
| 22 | Example 12 | A1 | 12 | B1 | 19 | C1 | 52 | D1 | 0.85 | E2 | 0.34 | — | 0 | phosphoric acid | 4 |
| 23 | Example 13 | A1 | 4 | B1 | 11 | C1 | 68 | D1 | 1.1 | E2 | 0.44 | — | 0 | phosphoric acid | 4 |
| 24 | Comparative Example 11 | A1 | 1 | B1 | 10 | C1 | 72 | D1 | 1.2 | E2 | 0.48 | — | 0 | phosphoric acid | 4 |
| 25 | Comparative Example 12 | A1 | 4 | B1 | 16 | C1 | 60 | D1 | 0.8 | E2 | 0.32 | — | 0 | phosphoric acid | 4 |
| 26 | Example 14 | A1 | 4 | B1 | 16 | C1 | 60 | D1 | 0.88 | E2 | 0.35 | — | 0 | phosphoric acid | 4 |
| 27 | Example 15 | A1 | 4 | B1 | 16 | C1 | 60 | D1 | 1.15 | E2 | 0.46 | — | 0 | phosphoric acid | 4 |
| 28 | Comparative Example 13 | A1 | 4 | B1 | 16 | C1 | 60 | D1 | 1.25 | E2 | 0.5 | — | 0 | phosphoric acid | 4 |
| 29 | Comparative Example 14 | A1 | 4 | B1 | 16 | C1 | 60 | D1 | 1 | E2 | <u>0.24</u> | — | 0 | phosphoric acid | 4 |
| 30 | Example 16 | A1 | 4 | B1 | 16 | C1 | 60 | D1 | 1 | E2 | 0.33 | — | 0 | phosphoric acid | 4 |
| 31 | Example 17 | A1 | 4 | B1 | 16 | C1 | 60 | D1 | 1 | E2 | 0.49 | — | 0 | phosphoric acid | 4 |
| 32 | Comparative Example 15 | A1 | 4 | B1 | 16 | C1 | 60 | D1 | 1 | E2 | 0.55 | — | 0 | phosphoric acid | 4 |
| 33 | Example 18 | A1 | 4 | B1 | 16 | C1 | 60 | D1 | 1 | E2 | 0.4 | W 1 | 6.1 | phosphoric acid | 4 |
| 34 | Example 19 | A1 | 4 | B1 | 16 | C1 | 60 | D1 | 1 | E2 | 0.4 | W 2 | 6.1 | phosphoric acid | 4 |
| 35 | Example 20 | A1 | 4 | B1 | 16 | C1 | 60 | D1 | 1 | E2 | 0.4 | W 3 | 6.1 | phosphoric acid | 4 |
| 36 | Example 21 | A1 | 4 | B1 | 16 | C1 | 60 | D1 | 1 | E2 | 0.4 | W 1 | 7.8 | phosphoric acid | 4 |
| 37 | Example 22 | A1 | 4 | B1 | 16 | C1 | 60 | D1 | 1 | E2 | 0.4 | W 1 | 5 | phosphoric acid | 4 |
| 38 | Comparative Example 16 | A1 | 4 | B1 | 16 | C1 | 60 | D1 | 1 | E1 | 0.4 | — | 0 | phosphoric acid | 4 |
| 39 | Comparative Example 17 | A1 | 4 | B1 | 16 | C1 | 60 | D1 | 1 | E1 | 0.4 | — | 0 | phosphoric acid | 4 |
| 40 | Example 23 | A1 | 4 | B1 | 16 | C1 | 60 | D1 | 1 | E1 | 0.4 | — | 0 | phosphoric acid | 4 |
| 41 | Example 24 | A1 | 4 | B1 | 16 | C1 | 60 | D1 | 1 | E1 | 0.4 | — | 0 | phosphoric acid | 4 |
| 42 | Comparative Example 18 | A1 | 4 | B1 | 16 | C1 | 60 | D1 | 1 | E1 | 0.4 | — | 0 | phosphoric acid | 4 |
| 43 | Comparative Example 19 | A1 | 4 | B1 | 16 | C1 | 60 | D1 | 1 | E1 | 0.4 | — | 0 | phosphoric acid | 4 |
| 44 | Example 1A | A1 | 4 | B1 | 16 | C1 | 60 | D1 | 1 | E1 | 0.4 | — | 0 | phosphoric acid | 4 |
| 45 | Example 25 | A1 | 4 | B1 | 16 | C1 | 60 | D1 | 1 | E1 | 0.4 | — | 0 | phosphoric acid | 4 |
| 46 | Example 26 | A1 | 4 | B1 | 16 | C1 | 60 | D1 | 1 | E1 | 0.4 | — | 0 | phosphoric acid | 4 |
| 47 | Example 27 | A1 | 4 | B1 | 16 | C1 | 60 | D1 | 1 | E1 | 0.4 | — | 0 | phosphoric acid | 4 |
| 48 | Example 28 | A1 | 4 | B1 | 16 | C1 | 60 | D1 | 1 | E1 | 0.4 | — | 0 | phosphoric acid | 4 |
| 49 | Example 2A | A1 | 4 | B1 | 16 | C1 | 60 | D1 | 1 | E1 | 0.4 | — | 0 | phosphoric acid | 4 |
| 50 | Example 1B | A1 | 4 | B1 | 16 | C1 | 60 | D1 | 1 | E1 | 0.4 | — | 0 | phosphoric acid | 4 |
| 51 | Example 29 | A1 | 4 | B1 | 16 | C1 | 60 | D1 | 1 | E1 | 0.4 | — | 0 | phosphoric acid | 4 |
| 52 | Example 30 | A1 | 4 | B1 | 16 | C1 | 60 | D1 | 1 | E1 | 0.4 | — | 0 | phosphoric acid | 4 |
| 53 | Example 2B | A1 | 4 | B1 | 16 | C1 | 60 | D1 | 1 | E1 | 0.4 | — | 0 | phosphoric acid | 4 |
| 54 | Example 31 | A4 | 4 | B1 | 16 | C1 | 60 | D1 | 1 | E1 | 0.4 | — | 0 | phosphoric acid | 4 |
| 55 | Comparative Example 20 | <u>A5</u> | 4 | B1 | 16 | C1 | 60 | D1 | 1 | E1 | 0.4 | — | 0 | phosphoric acid | 4 |
| 56 | Comparative Example 21 | <u>A6</u> | 4 | B1 | 16 | C1 | 60 | D1 | 1 | E1 | 0.4 | — | 0 | phosphoric acid | 4 |
| 57 | Comparative Example 22 | <u>A7</u> | 4 | B1 | 16 | C1 | 60 | D1 | 1 | E1 | 0.4 | — | 0 | phosphoric acid | 4 |
| 58 | Comparative Example 23 | <u>A8</u> | 4 | B1 | 16 | C1 | 60 | D1 | 1 | E1 | 0.4 | — | 0 | phosphoric acid | 4 |
| 59 | Comparative Example 24 | <u>A9</u> | 4 | B1 | 16 | C1 | 60 | D1 | 1 | E1 | 0.4 | — | 0 | phosphoric acid | 4 |
| 60 | Comparative Example 25 | <u>A10</u> | 4 | B1 | 16 | C1 | 60 | D1 | 1 | E1 | 0.4 | — | 0 | phosphoric acid | 4 |

TABLE 8-continued

| No. | | Type | parts by mass | | Type | parts by mass | | Type | parts by mass | | Type | parts by mass | | Type | parts by mass | | | Acid component 1 Type | parts by mass |
|---|---|---|---|---|---|---|---|---|---|---|---|---|---|---|---|---|---|---|---|
| 61 | Comparative Example 26 | A11 | 4 | B1 | 16 | C1 | 60 | D1 | 1 | E1 | 0.4 | — | 0 | phosphoric acid | 4 |
| 62 | Comparative Example 27 | A12 | 4 | B1 | 16 | C1 | 60 | D1 | 1 | E1 | 0.4 | — | 0 | phosphoric acid | 4 |
| 63 | Example 32 | A13 | 4 | B1 | 16 | C1 | 60 | D1 | 1 | E1 | 0.4 | — | 0 | phosphoric acid | 4 |
| 64 | Example 33 | A14 | 4 | B1 | 16 | C1 | 60 | D1 | 1 | E1 | 0.4 | — | 0 | phosphoric acid | 4 |
| 65 | Example 34 | A15 | 4 | B1 | 16 | C1 | 60 | D1 | 1 | E1 | 0.4 | — | 0 | phosphoric acid | 4 |
| 66 | Example 35 | A16 | 4 | B1 | 16 | C1 | 60 | D1 | 1 | E1 | 0.4 | — | 0 | phosphoric acid | 4 |
| 67 | Comparative Example 28 | A17 | 4 | B1 | 16 | C1 | 60 | D1 | 1 | E1 | 0.4 | — | 0 | phosphoric acid | 4 |
| 68 | Comparative Example 29 | A18 | 4 | B1 | 16 | C1 | 60 | D1 | 1 | E1 | 0.4 | — | 0 | phosphoric acid | 4 |
| 69 | Comparative Example 30 | A19 | 4 | B1 | 16 | C1 | 60 | D1 | 1 | E1 | 0.4 | — | 0 | phosphoric acid | 4 |
| 70 | Comparative Example 31 | A20 | 4 | B1 | 16 | C1 | 60 | D1 | 1 | E1 | 0.4 | — | 0 | phosphoric acid | 4 |
| 71 | Comparative Example 32 | A21 | 4 | B1 | 16 | C1 | 60 | D1 | 1 | E1 | 0.4 | — | 0 | phosphoric acid | 4 |
| 72 | Comparative Example 33 | A22 | 4 | B1 | 16 | C1 | 60 | D1 | 1 | E1 | 0.4 | — | 0 | phosphoric acid | 4 |
| 73 | Comparative Example 34 | A23 | 4 | B1 | 16 | C1 | 60 | D1 | 1 | E1 | 0.4 | — | 0 | phosphoric acid | 4 |
| 74 | Comparative Example 35 | A24 | 4 | B1 | 16 | C1 | 60 | D1 | 1 | E1 | 0.4 | — | 0 | phosphoric acid | 4 |
| 75 | Example 36 | A1 | 4 | B2 | 16 | C1 | 60 | D1 | 1 | E1 | 0.4 | — | 0 | phosphoric acid | 4 |
| 76 | Example 37 | A1 | 4 | B3 | 16 | C1 | 60 | D1 | 1 | E1 | 0.4 | — | 0 | phosphoric acid | 4 |
| 77 | Comparative Example 36 | A1 | 4 | B4 | 16 | C1 | 60 | D1 | 1 | E1 | 0.4 | — | 0 | phosphoric acid | 4 |
| 78 | Comparative Example 37 | A1 | 4 | B5 | 16 | C1 | 60 | D1 | 1 | E1 | 0.4 | — | 0 | phosphoric acid | 4 |
| 79 | Example 38 | A1 | 4 | B1 | 16 | C4 | 60 | D1 | 1 | E1 | 0.4 | — | 0 | phosphoric acid | 4 |
| 80 | Comparative Example 38 | A1 | 4 | B1 | 16 | C5 | 60 | D1 | 1 | E1 | 0.4 | — | 0 | phosphoric acid | 4 |
| 81 | Example 39 | A1 | 4 | B1 | 16 | C1 | 60 | D1 | 1 | E1 | 0.4 | — | 0 | phosphoric acid | 4 |

| No. | | Acid component 2 Type | parts by mass | pH | (X1) | (X2) | (X3) | (X4) | (X5) | $PO_4/(a+b+c)$ | $F/(a+b+c)$ | Coated steel sheet | Drying temperature °C. | Coating weight g/m² | Remarks |
|---|---|---|---|---|---|---|---|---|---|---|---|---|---|---|---|
| 1 | Example 1 | — | 0 | 4.5 | 0.20 | 0.75 | 60 | 0.40 | 0 | 0.050 | 0 | GI | 100 | 1.0 | |
| 2 | Example 2 | — | 0 | 4.5 | 0.13 | 0.75 | 60 | 0.40 | 0 | 0.050 | 0 | GI | 100 | 1.0 | |
| 3 | Example 3 | — | 0 | 4.5 | 0.11 | 0.75 | 60 | 0.40 | 0 | 0.050 | 0 | GI | 100 | 1.0 | |
| 4 | Comparative Example 1 | — | 0 | 4.5 | 0.08 | 0.75 | 60 | 0.40 | 0 | 0.050 | 0 | GI | 100 | 1.0 | |
| 5 | Example 4 | — | 0 | 4.5 | 0.24 | 0.75 | 60 | 0.40 | 0 | 0.050 | 0 | GI | 100 | 1.0 | |
| 6 | Example 5 | — | 0 | 4.5 | 0.27 | 0.73 | 58 | 0.40 | 0 | 0.050 | 0 | GI | 100 | 1.0 | |
| 7 | Example 6 | — | 0 | 4.5 | 0.29 | 0.70 | 56 | 0.40 | 0 | 0.050 | 0 | GI | 100 | 1.0 | |
| 8 | Comparative Example 2 | — | 0 | 4.5 | 0.32 | 0.68 | 55 | 0.40 | 0 | 0.049 | 0 | GI | 100 | 1.0 | |
| 9 | Comparative Example 3 | — | 0 | 4.5 | 0.20 | 0.75 | 60 | 0.40 | 0 | 0.050 | 0 | GI | 100 | 1.0 | |
| 10 | Comparative Example 4 | — | 0 | 4.5 | 0.20 | 0.75 | 60 | 0.40 | 0 | 0.050 | 0.030 | GI | 100 | 1.0 | |
| 11 | Comparative Example 5 | — | 0 | 4.5 | 0.20 | 0.75 | 60 | 0.00 | 0 | 0.050 | 0 | GI | 100 | 1.0 | |
| 12 | Comparative Example 6 | — | 0 | 4.5 | 0.20 | 0.75 | 60 | 0.40 | 0 | 0.050 | 0 | GI | 100 | 1.0 | |
| 13 | Comparative Example 7 | — | 0 | 4.5 | 0.06 | 0.65 | 57 | 0.00 | 0 | 0.100 | 0.027 | GI | 100 | 1.0 | Reference: Japanese Patent No. 3883831 |
| 14 | Comparative Example 8 | — | 0 | 4.5 | 0.06 | 0.65 | 57 | 0.00 | 0 | 0.100 | 0.027 | GI | 100 | 1.0 | |
| 15 | Comparative Example 9 | — | 0 | 4.5 | 0.50 | 0.25 | 20 | 0.40 | 0 | 0.075 | 0.030 | GI | 100 | 1.0 | Reference: Japanese Unexamined Patent Application Publication No. 2006-152436 |
| 16 | Example 7 | — | 0 | 4.5 | 0.20 | 0.75 | 60 | 0.40 | 0 | 0.050 | 0 | GI | 100 | 1.0 | |
| 17 | Example 8 | $H_2ZrF_6$ | 0.5 | 4.5 | 0.20 | 0.75 | 60 | 0.40 | 0 | 0.000 | 0.003 | EG | 100 | 1.0 | |
| 18 | Example 9 | hydrofluoric acid | 0.5 | 4.5 | 0.23 | 0.72 | 60 | 0.40 | 0 | 0.060 | 0.006 | GA | 100 | 1.0 | |
| 19 | Example 10 | hydrofluoric acid | 0.5 | 4.5 | 0.23 | 0.72 | 60 | 0.40 | 0 | 0.000 | 0.006 | GF | 100 | 1.0 | |

TABLE 8-continued

| | | | | | | | | | | | | | | |
|---|---|---|---|---|---|---|---|---|---|---|---|---|---|---|
| 20 | Example 11 | — | 0 | 4.5 | 0.23 | 0.72 | 55 | 0.36 | 0 | 0.048 | 0.003 | EG | 100 | 1.0 | |
| 21 | Comparative Example 10 | — | 0 | 4.5 | 0.23 | 0.54 | 60 | 0.40 | 0 | 0.048 | 0 | GI | 100 | 1.0 | |
| 22 | Example 12 | — | 0 | 4.5 | 0.23 | 0.63 | 61 | 0.40 | 0 | 0.048 | 0 | GI | 100 | 1.0 | |
| 23 | Example 13 | — | 0 | 4.5 | 0.13 | 0.82 | 62 | 0.40 | 0 | 0.048 | 0 | GI | 100 | 1.0 | |
| 24 | Comparative Example 11 | — | 0 | 4.5 | 0.12 | 0.87 | 60 | 0.40 | 0 | 0.048 | 0 | GI | 100 | 1.0 | |
| 25 | Comparative Example 12 | — | 0 | 4.5 | 0.20 | 0.75 | 75 | 0.40 | 0 | 0.050 | 0 | GI | 100 | 1.0 | |
| 26 | Example 14 | — | 0 | 4.5 | 0.20 | 0.75 | 68 | 0.40 | 0 | 0.050 | 0 | GI | 100 | 1.0 | |
| 27 | Example 15 | — | 0 | 4.5 | 0.20 | 0.75 | 52 | 0.40 | 0 | 0.050 | 0 | GI | 100 | 1.0 | |
| 28 | Comparative Example 13 | — | 0 | 4.5 | 0.20 | 0.75 | 48 | 0.40 | 0 | 0.050 | 0 | GI | 100 | 1.0 | |
| 29 | Comparative Example 14 | — | 0 | 4.5 | 0.20 | 0.75 | 60 | 0.24 | 0 | 0.050 | 0 | GI | 100 | 1.0 | |
| 30 | Example 16 | — | 0 | 4.5 | 0.20 | 0.75 | 60 | 0.33 | 0 | 0.050 | 0 | GI | 100 | 1.0 | |
| 31 | Example 17 | — | 0 | 4.5 | 0.20 | 0.75 | 60 | 0.49 | 0 | 0.050 | 0 | GI | 100 | 1.0 | |
| 32 | Comparative Example 15 | — | 0 | 4.5 | 0.20 | 0.75 | 60 | 0.55 | 0 | 0.050 | 0 | GI | 100 | 1.0 | |
| 33 | Example 18 | — | 0 | 4.5 | 0.20 | 0.75 | 60 | 0.40 | 0.31 | 0.050 | 0 | GI | 100 | 1.0 | |
| 34 | Example 19 | — | 0 | 4.5 | 0.20 | 0.75 | 60 | 0.40 | 0.31 | 0.050 | 0 | GI | 100 | 1.0 | |
| 35 | Example 20 | — | 0 | 4.5 | 0.20 | 0.75 | 60 | 0.40 | 0.31 | 0.050 | 0 | GI | 100 | 1.0 | |
| 36 | Example 21 | — | 0 | 4.5 | 0.20 | 0.75 | 60 | 0.40 | 0.39 | 0.050 | 0 | GI | 100 | 1.0 | |
| 37 | Example 22 | — | 0 | 4.5 | 0.20 | 0.75 | 60 | 0.40 | 0.25 | 0.050 | 0 | GI | 100 | 1.0 | |
| 38 | Comparative Example 16 | — | 0 | 3.0 | 0.20 | 0.75 | 60 | 0.40 | 0 | 0.050 | 0 | GI | 100 | 1.0 | |
| 39 | Comparative Example 17 | — | 0 | 3.4 | 0.20 | 0.75 | 60 | 0.40 | 0 | 0.050 | 0 | GI | 100 | 1.0 | |
| 40 | Example 23 | — | 0 | 4.0 | 0.20 | 0.75 | 60 | 0.40 | 0 | 0.050 | 0 | GI | 100 | 1.0 | |
| 41 | Example 24 | — | 0 | 5.0 | 0.20 | 0.75 | 60 | 0.40 | 0 | 0.050 | 0 | GI | 100 | 1.0 | |
| 42 | Comparative Example 18 | — | 0 | 5.5 | 0.20 | 0.75 | 60 | 0.40 | 0 | 0.050 | 0 | GI | 100 | 1.0 | |
| 43 | Comparative Example 19 | — | 0 | 6.0 | 0.20 | 0.75 | 60 | 0.40 | 0 | 0.050 | 0 | GI | — | — | |
| 44 | Example 1A | — | 0 | 4.5 | 0.20 | 0.75 | 60 | 0.40 | 0 | 0.050 | 0 | GI | 100 | 0.1 | Examples according to Claims 1 and 2 |
| 45 | Example 25 | — | 0 | 4.5 | 0.20 | 0.75 | 60 | 0.40 | 0 | 0.050 | 0 | GI | 100 | 0.3 | |
| 46 | Example 26 | — | 0 | 4.5 | 0.20 | 0.75 | 60 | 0.40 | 0 | 0.050 | 0 | GI | 100 | 0.5 | |
| 47 | Example 27 | — | 0 | 4.5 | 0.20 | 0.75 | 60 | 0.40 | 0 | 0.050 | 0 | GI | 100 | 1.3 | |
| 48 | Example 28 | — | 0 | 4.5 | 0.20 | 0.75 | 60 | 0.40 | 0 | 0.050 | 0 | GI | 100 | 1.5 | |
| 49 | Example 2A | — | 0 | 4.5 | 0.20 | 0.75 | 60 | 0.40 | 0 | 0.050 | 0 | GI | 100 | 2.0 | Examples according to Claims 1 and 2 |
| 50 | Example 1B | — | 0 | 4.5 | 0.20 | 0.75 | 60 | 0.40 | 0 | 0.050 | 0 | GI | 40 | 1.0 | Examples according to Claims 1 and 2 |
| 51 | Example 29 | — | 0 | 4.5 | 0.20 | 0.75 | 60 | 0.40 | 0 | 0.050 | 0 | GI | 60 | 1.0 | |
| 52 | Example 30 | — | 0 | 4.5 | 0.20 | 0.75 | 60 | 0.40 | 0 | 0.050 | 0 | GI | 140 | 1.0 | |
| 53 | Example 2B | — | 0 | 4.5 | 0.20 | 0.75 | 60 | 0.40 | 0 | 0.050 | 0 | GI | 220 | 1.0 | Examples according to Claims 1 and 2 |
| 54 | Example 31 | — | 0 | 4.5 | 0.20 | 0.75 | 60 | 0.40 | 0 | 0.050 | 0 | GI | 100 | 1.0 | |
| 55 | Comparative Example 20 | — | 0 | 4.5 | 0.20 | 0.75 | 60 | 0.40 | 0 | 0.050 | 0 | GI | — | — | |
| 56 | Comparative Example 21 | — | 0 | 4.5 | 0.20 | 0.75 | 60 | 0.40 | 0 | 0.050 | 0 | GI | 100 | 1.0 | |
| 57 | Comparative Example 22 | — | 0 | 4.5 | 0.20 | 0.75 | 60 | 0.40 | 0 | 0.050 | 0 | GI | 100 | 1.0 | |
| 58 | Comparative Example 23 | — | 0 | 4.5 | 0.20 | 0.75 | 60 | 0.40 | 0 | 0.050 | 0 | GI | — | — | |
| 59 | Comparative Example 24 | — | 0 | 4.5 | 0.20 | 0.75 | 60 | 0.40 | 0 | 0.050 | 0 | GI | — | — | |
| 60 | Comparative Example 25 | — | 0 | 4.5 | 0.20 | 0.75 | 60 | 0.40 | 0 | 0.050 | 0 | GI | 100 | 1.0 | |
| 61 | Comparative Example 26 | — | 0 | 4.5 | 0.20 | 0.75 | 60 | 0.40 | 0 | 0.050 | 0 | GI | 100 | 1.0 | |
| 62 | Comparative Example 27 | — | 0 | 4.5 | 0.20 | 0.75 | 60 | 0.40 | 0 | 0.050 | 0 | GI | — | — | |
| 63 | Example 32 | — | 0 | 4.5 | 0.20 | 0.75 | 60 | 0.40 | 0 | 0.050 | 0 | GI | 100 | 1.0 | |
| 64 | Example 33 | — | 0 | 4.5 | 0.20 | 0.75 | 60 | 0.40 | 0 | 0.050 | 0 | GI | 100 | 1.0 | |
| 65 | Example 34 | — | 0 | 4.5 | 0.20 | 0.75 | 60 | 0.40 | 0 | 0.050 | 0 | GI | 100 | 1.0 | |
| 66 | Example 35 | — | 0 | 4.5 | 0.20 | 0.75 | 60 | 0.40 | 0 | 0.050 | 0 | GI | 100 | 1.0 | |
| 67 | Comparative Example 28 | — | 0 | 4.5 | 0.20 | 0.75 | 60 | 0.40 | 0 | 0.050 | 0 | GI | — | — | |

TABLE 8-continued

| No. | | | | | | | | | | | | | | | |
|---|---|---|---|---|---|---|---|---|---|---|---|---|---|---|---|
| 68 | Comparative Example 29 | — | 0 | 4.5 | 0.20 | 0.75 | 60 | 0.40 | 0 | 0.050 | 0 | GI | 100 | 1.0 |
| 69 | Comparative Example 30 | — | 0 | 4.5 | 0.20 | 0.75 | 60 | 0.40 | 0 | 0.050 | 0 | GI | 100 | 1.0 |
| 70 | Comparative Example 31 | — | 0 | 4.5 | 0.20 | 0.75 | 60 | 0.40 | 0 | 0.050 | 0 | GI | — | — |
| 71 | Comparative Example 32 | — | 0 | 4.5 | 0.20 | 0.75 | 60 | 0.40 | 0 | 0.050 | 0 | GI | — | — |
| 72 | Comparative Example 33 | — | 0 | 4.5 | 0.20 | 0.75 | 60 | 0.40 | 0 | 0.050 | 0 | GI | 100 | 1.0 |
| 73 | Comparative Example 34 | — | 0 | 4.5 | 0.20 | 0.75 | 60 | 0.40 | 0 | 0.050 | 0 | GI | 100 | 1.0 |
| 74 | Comparative Example 35 | — | 0 | 4.5 | 0.20 | 0.75 | 60 | 0.40 | 0 | 0.050 | 0 | GI | — | — |
| 75 | Example 36 | — | 0 | 4.5 | 0.20 | 0.75 | 60 | 0.40 | 0 | 0.050 | 0 | GI | 100 | 1.0 |
| 76 | Example 37 | — | 0 | 4.5 | 0.20 | 0.75 | 60 | 0.40 | 0 | 0.050 | 0 | GI | 100 | 1.0 |
| 77 | Comparative Example 36 | — | 0 | 4.5 | 0.20 | 0.75 | 60 | 0.40 | 0 | 0.050 | 0 | GI | — | — |
| 78 | Comparative Example 37 | — | 0 | 4.5 | 0.20 | 0.75 | 60 | 0.40 | 0 | 0.050 | 0 | GI | — | — |
| 79 | Example 38 | — | 0 | 4.5 | 0.20 | 0.75 | 60 | 0.40 | 0 | 0.050 | 0 | GI | 100 | 1.0 |
| 80 | Comparative Example 38 | — | 0 | 4.5 | 0.20 | 0.75 | 60 | 0.40 | 0 | 0.050 | 0 | GI | 100 | 1.0 |
| 81 | Example 39 | — | 0 | 4.5 | 0.20 | 0.75 | 60 | 0.40 | 0 | 0.050 | 0 | GL | 100 | 1.0 |

| | | Corrosion resistance | | | | Paintability | | |
|---|---|---|---|---|---|---|---|---|
| No. | | (1) Flat portion | (2) Bent portion | (3) After degreasing | Thermal discoloration resistance (4) | (5) Without degreasing | (6) After degreasing | Solvent resistance (7) |
| 1 | Example 1 | Excellent | Excellent | Excellent | Excellent | Excellent | Excellent | Excellent |
| 2 | Example 2 | Excellent | Very Good | Excellent | Good | Excellent | Excellent | Excellent |
| 3 | Example 3 | Excellent | Fair | Excellent | Good | Excellent | Excellent | Excellent |
| 4 | Comparative Example 1 | Excellent | Very poor | Excellent | Poor | Excellent | Excellent | Excellent |
| 5 | Example 4 | Excellent | Excellent | Excellent | Excellent | Excellent | Excellent | Very Good |
| 6 | Example 5 | Excellent | Excellent | Excellent | Excellent | Excellent | Very Good | Good |
| 7 | Example 6 | Excellent | Excellent | Fair | Excellent | Excellent | Fair | Fair |
| 8 | Comparative Example 2 | Excellent | Excellent | Poor | Excellent | Excellent | Poor | Very poor |
| 9 | Comparative Example 3 | Excellent | Very poor | Very poor | Excellent | Good | Very poor | Very Good |
| 10 | Comparative Example 4 | Excellent | Very poor | Fair | Excellent | Excellent | Poor | Excellent |
| 11 | Comparative Example 5 | Good | Very poor | Very poor | Excellent | Excellent | Excellent | Excellent |
| 12 | Comparative Example 6 | Excellent | Poor | Very poor | Excellent | Excellent | Very poor | Excellent |
| 13 | Comparative Example 7 | Excellent | Very poor | Good | Excellent | Excellent | Good | Excellent |
| 14 | Comparative Example 8 | Excellent | Very poor | Good | Excellent | Excellent | Very Good | Excellent |
| 15 | Comparative Example 9 | Excellent | Very poor | Poor | Fair | Excellent | Fair | Very poor |
| 16 | Example 7 | Excellent | Excellent | Excellent | Excellent | Excellent | Excellent | Excellent |
| 17 | Example 8 | Excellent | Good | Excellent | Excellent | Excellent | Excellent | Excellent |
| 18 | Example 9 | Excellent | Excellent | Excellent | Excellent | Excellent | Excellent | Excellent |
| 19 | Example 10 | Excellent | Good | Good | Excellent | Excellent | Excellent | Excellent |
| 20 | Example 11 | Excellent | Excellent | Excellent | Excellent | Excellent | Excellent | Excellent |
| 21 | Comparative Example 10 | Excellent | Good | Good | Fair | Very Good | Poor | Very poor |
| 22 | Example 12 | Excellent | Very Good | Very Good | Good | Excellent | Excellent | Excellent |
| 23 | Example 13 | Excellent | Very Good | Excellent | Excellent | Excellent | Excellent | Excellent |
| 24 | Comparative Example 11 | Excellent | Very poor | Good | Excellent | Excellent | Excellent | Excellent |
| 25 | Comparative Example 12 | Poor | Poor | Very poor | Excellent | Very Good | Very poor | Very Good |
| 26 | Example 14 | Good | Fair | Fair | Excellent | Excellent | Excellent | Excellent |
| 27 | Example 15 | Excellent | Fair | Excellent | Excellent | Excellent | Excellent | Excellent |
| 28 | Comparative Example 13 | Excellent | Very poor | Excellent | Excellent | Excellent | Excellent | Excellent |
| 29 | Comparative Example 14 | Very poor | Very poor | Very poor | Excellent | Excellent | Excellent | Good |
| 30 | Example 16 | Good | Fair | Fair | Excellent | Excellent | Excellent | Excellent |

TABLE 8-continued

| # | Name | C1 | C2 | C3 | C4 | C5 | C6 | C7 |
|---|---|---|---|---|---|---|---|---|
| 31 | Example 17 | Very Good | Fair | Fair | Excellent | Excellent | Good | Excellent |
| 32 | Comparative Example 15 | Excellent | Fair | Very poor | Excellent | Excellent | Very poor | Good |
| 33 | Example 18 | Excellent | Excellent | Excellent | Excellent | Excellent | Excellent | Excellent |
| 34 | Example 19 | Excellent | Excellent | Excellent | Excellent | Excellent | Excellent | Excellent |
| 35 | Example 20 | Excellent | Excellent | Excellent | Excellent | Excellent | Excellent | Excellent |
| 36 | Example 21 | Excellent | Excellent | Excellent | Excellent | Excellent | Excellent | Excellent |
| 37 | Example 22 | Excellent | Excellent | Excellent | Excellent | Excellent | Excellent | Excellent |
| 38 | Comparative Example 16 | Poor | Very poor | Very poor | Excellent | Poor | Poor | Excellent |
| 39 | Comparative Example 17 | Good | Poor | Poor | Excellent | Good | Good | Excellent |
| 40 | Example 23 | Very Good | Very Good | Very Good | Excellent | Excellent | Excellent | Excellent |
| 41 | Example 24 | Excellent | Excellent | Excellent | Excellent | Excellent | Excellent | Excellent |
| 42 | Comparative Example 18 | Poor | Poor | Poor | Excellent | Excellent | Good | Excellent |
| 43 | Comparative Example 19 | The test was terminated because the treatment solution gelated. | | | | | | |
| 44 | Example 1A | Very poor | Very poor | Very poor | Excellent | Excellent | Fair | Excellent |
| 45 | Example 25 | Good | Fair | Fair | Excellent | Excellent | Excellent | Excellent |
| 46 | Example 26 | Very Good | Fair | Fair | Excellent | Excellent | Excellent | Excellent |
| 47 | Example 27 | Excellent | Excellent | Excellent | Excellent | Excellent | Excellent | Very Good |
| 48 | Example 28 | Excellent | Excellent | Excellent | Good | Good | Good | Good |
| 49 | Example 2A | Excellent | Good | Excellent | Good | Very poor | Very poor | Poor |
| 50 | Example 1B | Good | Good | Very poor | Excellent | Good | Very poor | Poor |
| 51 | Example 29 | Very Good | Very Good | Very Good | Excellent | Excellent | Good | Good |
| 52 | Example 30 | Excellent | Excellent | Excellent | Excellent | Excellent | Excellent | Excellent |
| 53 | Example 2B | Excellent | Poor | Excellent | Excellent | Poor | Poor | Excellent |
| 54 | Example 31 | Excellent | Excellent | Excellent | Excellent | Excellent | Excellent | Excellent |
| 55 | Comparative Example 20 | The test was terminated because unsolved matter was generated in the preparation of the treatment solution. | | | | | | |
| 56 | Comparative Example 21 | Poor | Very poor | Very poor | Excellent | Good | Very poor | Excellent |
| 57 | Comparative Example 22 | Excellent | Poor | Good | Excellent | Excellent | Excellent | Excellent |
| 58 | Comparative Example 23 | The test was terminated because unsolved matter was generated in the preparation of the treatment solution. | | | | | | |
| 59 | Comparative Example 24 | The test was terminated because unsolved matter was generated in the preparation of the treatment solution. | | | | | | |
| 60 | Comparative Example 25 | Poor | Very poor | Very poor | Excellent | Good | Very poor | Excellent |
| 61 | Comparative Example 26 | Excellent | Poor | Good | Excellent | Excellent | Excellent | Excellent |
| 62 | Comparative Example 27 | The test was terminated because unsolved matter was generated in the preparation of the treatment solution. | | | | | | |
| 63 | Example 32 | Excellent | Excellent | Excellent | Excellent | Excellent | Excellent | Excellent |
| 64 | Example 33 | Excellent | Good | Excellent | Excellent | Excellent | Excellent | Excellent |
| 65 | Example 34 | Excellent | Excellent | Good | Excellent | Excellent | Good | Excellent |
| 66 | Example 35 | Excellent | Excellent | Excellent | Excellent | Excellent | Excellent | Excellent |
| 67 | Comparative Example 28 | The test was terminated because unsolved matter was generated in the preparation of the treatment solution. | | | | | | |
| 68 | Comparative Example 29 | Poor | Very poor | Very poor | Excellent | Good | Very poor | Excellent |
| 69 | Comparative Example 30 | Excellent | Poor | Fair | Excellent | Excellent | Excellent | Excellent |
| 70 | Comparative Example 31 | The test was terminated because unsolved matter was generated in the preparation of the treatment solution. | | | | | | |
| 71 | Comparative Example 32 | The test was terminated because unsolved matter was generated in the preparation of the treatment solution. | | | | | | |
| 72 | Comparative Example 33 | Poor | Very poor | Very poor | Excellent | Good | Very poor | Excellent |
| 73 | Comparative Example 34 | Excellent | Poor | Good | Excellent | Excellent | Excellent | Excellent |
| 74 | Comparative Example 35 | The test was terminated because unsolved matter was generated in the preparation of the treatment solution. | | | | | | |
| 75 | Example 36 | Excellent | Excellent | Excellent | Excellent | Excellent | Excellent | Excellent |
| 76 | Example 37 | Excellent | Excellent | Excellent | Excellent | Excellent | Good | Excellent |
| 77 | Comparative Example 36 | The test was terminated because the urethane resin aggregated in the preparation of the treatment solution. | | | | | | |
| 78 | Comparative Example 37 | The test was terminated because the urethane resin aggregated in the preparation of the treatment solution. | | | | | | |
| 79 | Example 38 | Excellent | Excellent | Excellent | Excellent | Excellent | Excellent | Excellent |

TABLE 8-continued

| 80 | Comparative Example 38 | Excellent | Poor | Very poor | Excellent | Good | Poor | Good |
| 81 | Example 39 | Excellent | Good | Very Good | Excellent | Excellent | Good | Excellent |

| | | (8) | Storage stability | Corrosion resistance | | Lubricity |
|---|---|---|---|---|---|---|
| No. | Appearance | Flat portion | Bent portion | After degreasing | (9) |
| 1 | Excellent | Excellent | Excellent | Excellent | Poor |
| 2 | Excellent | Excellent | Very Good | Very Good | Very poor |
| 3 | Excellent | Very Good | Fair | Fair | Very poor |
| 4 | Excellent | Good | Very poor | Very poor | Very poor |
| 5 | Excellent | Excellent | Excellent | Excellent | Poor |
| 6 | Excellent | Excellent | Excellent | Excellent | Poor |
| 7 | Excellent | Excellent | Excellent | Fair | Poor |
| 8 | Excellent | Excellent | Good | Very poor | Poor |
| 9 | Excellent | Very Good | Very poor | Very poor | Poor |
| 10 | Excellent | Excellent | Very poor | Poor | Poor |
| 11 | Excellent | Good | Very poor | Very poor | Poor |
| 12 | Fair | Good | Very poor | Very poor | Poor |
| 13 | Excellent | Poor | Very poor | Fair | Very poor |
| 14 | Excellent | Fair | Very poor | Poor | Very poor |
| 15 | Excellent | Fair | Very poor | Very poor | Poor |
| 16 | Excellent | Excellent | Excellent | Excellent | Poor |
| 17 | Excellent | Excellent | Good | Excellent | Poor |
| 18 | Excellent | Excellent | Excellent | Excellent | Poor |
| 19 | Excellent | Excellent | Good | Good | Poor |
| 20 | Excellent | Excellent | Excellent | Excellent | Poor |
| 21 | Excellent | Excellent | Fair | Fair | Poor |
| 22 | Excellent | Excellent | Good | Good | Poor |
| 23 | Excellent | Good | Fair | Fair | Very poor |
| 24 | Excellent | Very poor | Very poor | Very poor | Very poor |
| 25 | Excellent | Poor | Very poor | Very poor | Poor |
| 26 | Excellent | Good | Fair | Fair | Poor |
| 27 | Excellent | Excellent | Poor | Fair | Poor |
| 28 | Fair | Good | Very poor | Very poor | Poor |
| 29 | Excellent | Very poor | Very poor | Very poor | Poor |
| 30 | Excellent | Good | Fair | Fair | Poor |
| 31 | Excellent | Good | Fair | Fair | Poor |
| 32 | Excellent | Good | Very poor | Very poor | Poor |
| 33 | Excellent | Excellent | Excellent | Excellent | Excellent |
| 34 | Excellent | Excellent | Excellent | Excellent | Excellent |
| 35 | Excellent | Excellent | Excellent | Excellent | Poor |
| 36 | Excellent | Excellent | Excellent | Excellent | Excellent |
| 37 | Excellent | Excellent | Excellent | Excellent | Good |
| 38 | Excellent | Very poor | Very poor | Very poor | Poor |
| 39 | Excellent | Poor | Very poor | Very poor | Poor |
| 40 | Excellent | Very Good | Good | Good | Poor |
| 41 | Excellent | Excellent | Excellent | Excellent | Poor |
| 42 | Excellent | Poor | Poor | Poor | Poor |
| 43 | The test was terminated because the treatment solution gelated. | | | | |
| 44 | Excellent | Very poor | Very poor | Very poor | Poor |
| 45 | Excellent | Good | Fair | Fair | Poor |
| 46 | Excellent | Very Good | Fair | Fair | Poor |
| 47 | Excellent | Excellent | Excellent | Excellent | Poor |

TABLE 8-continued

| | | | | | |
|---|---|---|---|---|---|
| 48 | Excellent | Excellent | Excellent | Excellent | Poor |
| 49 | Excellent | Excellent | Good | Excellent | Poor |
| 50 | Excellent | Good | Good | Very poor | Poor |
| 51 | Excellent | Very Good | Very Good | Very Good | Poor |
| 52 | Excellent | Excellent | Excellent | Excellent | Poor |
| 53 | Excellent | Excellent | Poor | Excellent | Poor |
| 54 | Excellent | Excellent | Good | Excellent | Poor |
| 55 | The test was terminated because unsolved matter was generated in the preparation of the treatment solution. | | | | |
| 56 | Excellent | Very poor | Very poor | Very poor | Poor |
| 57 | Poor | The test was terminated because of gelation. | | | Poor |
| 58 | The test was terminated because unsolved matter was generated in the preparation of the treatment solution. | | | | |
| 59 | The test was terminated because unsolved matter was generated in the preparation of the treatment solution. | | | | |
| 60 | Excellent | Very poor | Very poor | Very poor | Poor |
| 61 | Poor | The test was terminated because of gelation. | | | Poor |
| 62 | The test was terminated because unsolved matter was generated in the preparation of the treatment solution. | | | | |
| 63 | Excellent | Excellent | Excellent | Excellent | Poor |
| 64 | Excellent | Excellent | Good | Excellent | Poor |
| 65 | Excellent | Excellent | Excellent | Good | Poor |
| 66 | Excellent | Excellent | Excellent | Good | Poor |
| 67 | The test was terminated because unsolved matter was generated in the preparation of the treatment solution. | | | | |
| 68 | Excellent | Very poor | Very poor | Very poor | Poor |
| 69 | Poor | The test was terminated because of gelation. | | | Poor |
| 70 | The test was terminated because unsolved matter was generated in the preparation of the treatment solution. | | | | |
| 71 | The test was terminated because unsolved matter was generated in the preparation of the treatment solution. | | | | |
| 72 | Excellent | Very poor | Very poor | Very poor | Poor |
| 73 | Poor | The test was terminated because of gelation. | | | Poor |
| 74 | The test was terminated because unsolved matter was generated in the preparation of the treatment solution. | | | | |
| 75 | Excellent | Excellent | Excellent | Good | Poor |
| 76 | Excellent | Excellent | Good | Good | Poor |
| 77 | The test was terminated because the urethane resin aggregated in the preparation of the treatment solution. | | | | |
| 78 | The test was terminated because the urethane resin aggregated in the preparation of the treatment solution. | | | | |
| 79 | Excellent | Excellent | Excellent | Excellent | Poor |
| 80 | Excellent | Good | Very poor | Very poor | Poor |
| 81 | Excellent | Excellent | Good | Good | Poor |

(※) $X1 = (b)/(a + b + c)$, $X2 = (c)/(a + b + c)$, $X3 = (c)/Ti$, $X4 = V/Ti$, $X5 = (w)/(a + b)$

As described in Table 8, all the test sheets produced with our surface-treatment agents are excellent in terms of corrosion resistance (flat portion, processed portion, and after alkaline degreasing), thermal discoloration resistance, paintability (without degreasing and after degreasing), and solvent resistance. Our surface-treatment agents after storage maintain excellent quality similar to that before storage.

In contrast, in Comparative Example 1 (No. 4) that does not satisfy our requirements, since the content of the cationic urethane (B) was less than the lower limit of our range, sufficient corrosion resistance in a bent portion was not provided at all and corrosion resistance was degraded after storage. In Comparative Example 2 (No. 8), since the content of the cationic urethane (B) was more than the upper limit of our range, the quality after alkaline degreasing was poor and sufficient solvent resistance was not provided. In Comparative Example 3 (No. 9) and Comparative Example 4 (No. 10), since organic titanium chelate compounds (D) were not added, sufficient quality in terms of bent portions and after alkaline degreasing were not achieved.

In Comparative Example 5 (No. 11), Comparative Example 7 (No. 13), and Comparative Example 8 (No. 14) in which tetravalent vanadyl compounds (E) were not added, sufficient corrosion resistance in bent portions was also not achieved and the quality after storage was de-graded. In Comparative Example 6 (No. 12), since a pentavalent vanadyl compound was used, sufficient corrosion resistance in a bent portion and sufficient corrosion resistance after alkaline degreasing were not achieved, and paintability after alkaline degreasing was degraded. In Comparative Example 9 (No. 15), although the tetravalent vanadyl compound (E) was used, the composition was not appropriate. Hence, a bent portion and solvent resistance were not achieved and corrosion resistance after storage was degraded. Note that Comparative Example 7 (No. 13) was tested with reference to Japanese Patent No. 3,883,831; and Comparative Example 9 (No. 15)

was tested with reference to Japanese Unexamined Patent Application Publication No. 2006-152436.

In Comparative Example 10 (No. 21), since the content of the silane coupling agent (C) was less than the lower limit of our range, solvent resistance was poor. Whereas, in Comparative Example 11 (No. 24), since the content was more than the upper limit of our range, sufficient corrosion resistance in a bent portion was not provided and the solution after storage did not provide corrosion resistance. In Comparative Example 12 (No. 25), since the content of the silane coupling agent (C) relative to titanium of the organic titanium chelate compound (D) was more than the upper limit of our range, corrosion resistance and paintability after alkaline degreasing were poor. Whereas, in Comparative Example 13 (No. 28), since the content was less than the lower limit of our range, sufficient corrosion resistance in a bent portion was not provided and the solution after storage did not provide sufficient corrosion resistance.

In Comparative Example 14 (No. 29), since the vanadium content of the tetravalent vanadyl compound (E) relative to titanium of the organic titanium chelate compound (D) was less than the lower limit of our range, sufficient corrosion resistance was not provided. Whereas, in Comparative Example 15 (No. 32), since the content was more than the upper limit of our range, corrosion resistance and paintability after alkaline degreasing were poor. In Comparative Examples 16 (No. 38), 17 (No. 39), 18 (No. 42), and 19 (No. 43) in which pH was not adjusted to be in the proper range, sufficient corrosion resistance was not achieved and storage stability was poor. In Comparative Example 19 (No. 43) in which the pH was high, the agent gelated and the test was not performed.

As for the resin compound (A), in Comparative Examples 20 (No. 55), 24 (No. 59), 28 (No. 67), and 32 (No. 71), the average substitution number of the Z group was less than the lower limit of our range. Hence, unsolved matter was generated in the preparation of the surface-treatment agents and, in Comparative Examples 23 (No. 58), 27 (No. 62), 31 (No. 70), and 35 (No. 74), the number of carbon atoms of alkyl groups of the Z group was more than the upper limit of our range. Hence, unsolved matter was generated in the preparation of the surface-treatment agents. In Comparative Examples 21 (No. 56), 25 (No. 60), 29 (No. 68), and 33 (No. 72), the average substitution number of the Z group was more than the upper limit of our range. Hence, the surface-treatment agents after storage did not maintain quality similar to that before storage. In Comparative Examples 22 (No. 57), 26 (No. 61), 30 (No. 69), and 34 (No. 73), the average degree of polymerization of the Z group was more than the upper limit of our range. Hence, the surface-treatment agents after storage gelated.

In Comparative Example 36 (No. 77), since the urethane resin was the nonionic resin, the urethane resin aggregated in the preparation of the surface-treatment agent. In Comparative Example 37 (No. 78), since the urethane resin was the anionic resin, the urethane resin aggregated in the preparation of the surface-treatment agent. In Comparative Example 38 (No. 80), the silane coupling agent did not satisfy our requirement. Hence, sufficient corrosion resistance was not provided.

Even when our surface-treatment agent is used, unless the appropriate coating weight and drying condition are satisfied, desired advantages are not provided. In Invention Examples 1A (No. 44), 2A (No. 49), 1B (No. 50), and 2B (No. 53), our surface-treatment agents were used and were excellent in terms of thermal discoloration resistance and storage stability (appearance). However, in Invention Example 1A (No. 44), since the coating weight of the film was less than the lower limit of our range, sufficient corrosion resistance was not provided. In Invention Example 2A (No. 49), since the coating weight of the film was more than the upper limit of our range, paintability was poor. In Invention Example 1B (No. 50), since the drying temperature was less than the lower limit of our range, sufficient corrosion resistance was not provided. In Invention Example 2B (No. 53), since the drying temperature was more than the upper limit of our range, corrosion resistance in a bent portion and paintability were poor.

INDUSTRIAL APPLICABILITY

Surface-treated coated steel sheets that are excellent in terms of corrosion resistance (in particular, in bent portions), heat resistance, paintability, and solvent resistance can be provided with a treatment agent without using a chromate treatment. In addition, such a treatment agent that has excellent quality even after storage in the state of a one-component agent also provides advantages of cost reduction and waste reduction.

The invention claimed is:

1. A surface-treatment agent comprising:

a resin compound (A) having a bisphenol skeleton represented by a Formula (I);

a cationic urethane resin emulsion (B) having at least one cationic functional group selected from the group consisting of primary to tertiary amino groups and a quaternary ammonium salt group;

(C) at least one silane coupling agent having at least one reactive functional group selected from the group consisting of an active-hydrogen-containing amino group, an epoxy group, a mercapto group, and a methacryloxy group;

(D) an organic titanium chelate compound;

(E) a tetravalent vanadyl compound; and (F) water, wherein, a mass ratio [(b)/{(a)+(b)+(c)}] of a solid content of the cationic urethane (B) to a total of solid contents of the resin compound (A), the cationic urethane (B), and the silane coupling agent (C) is 0.1 to 0.3, a mass ratio [(c)/{(a)+(b)+(c)}] of solid content of silane coupling agent (C) to a total of solid contents of the resin compound (A), the cationic urethane (B), and the silane coupling agent (C) is 0.6 to 0.85, a mass ratio {(c)/Ti} of solid content of the silane coupling agent (C) to a content of the organic titanium chelate compound (D) in terms of titanium is 50 to 70, a mass ratio (V/Ti) of a content of the tetravalent vanadyl compound (E) in terms of vanadium to the content of the organic titanium chelate compound (D) in terms of titanium is 0.3 to 0.5, the surface-treatment agent has a pH of 4 to 5, in the formulae, (a) represents the solid content of the resin compound (A), (b) represents the solid content of the cationic urethane (B), (c) represents the solid content of the silane coupling agent (C), Ti represents the content of the organic titanium chelate compound (D) in terms of titanium, and V represents the content of the tetravalent vanadyl compound (E) in terms of vanadium,

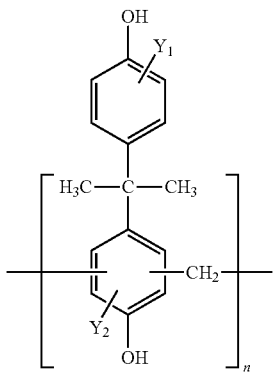
(I)

where $Y_1$ and $Y_2$ are bonded to benzene rings each independently represent hydrogen or a Z group represented by a general formula (II) or (III) below; an average substitution number of the Z group per benzene ring is 0.2 to 1.0; n represents an integer of 2 to 50, and

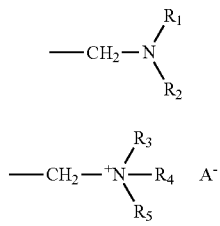
(II)
(III)

wherein $R_1$, $R_2$, $R_3$, $R_4$, and $R_5$ each independently represent a hydrogen atom, an alkyl group having 1 to 10 carbon atoms, or a hydroxyalkyl group having 1 to 10 carbon atoms; and $A^-$ represents a hydroxide ion or an acid ion.

2. The surface-treatment agent according to claim 1, further comprising:

(W) a wax, wherein a mass ratio $[(w)/\{(a)+(b)\}]$ of a solid content of the wax (W) to a total of the solid contents of the resin compound (A) and the cationic urethane (B) is 0.2 to 0.4, and in the formula, w represents the solid content of the wax (W), (a) represents the solid content of the resin compound (A), and (b) represents the solid content of the cationic urethane (B).

3. A method for producing a coated steel sheet, comprising applying the surface-treatment agent according to claim 1 to a coated steel sheet, and drying the surface-treatment agent at a sheet temperature of 50° C. to 180° C. to form a surface-treatment film having a coating weight of 0.2 to 1.8 g/m² on a surface of the steel sheet.

4. A coated steel sheet produced by the method according to claim 3.

5. A method for producing a coated steel sheet, comprising applying the surface-treatment agent according to claim 2 to a coated steel sheet, and drying the surface-treatment agent at a sheet temperature of 50° C. to 180° C. to form a surface-treatment film having a coating weight of 0.2 to 1.8 g/m² on a surface of the steel sheet.

6. A coated steel sheet produced by the method according to claim 3.

* * * * *